US008393886B2

(12) United States Patent
D'Amato

(10) Patent No.: US 8,393,886 B2
(45) Date of Patent: Mar. 12, 2013

(54) DEVICE FOR PRODUCING A STACKING PROJECTION AND CONTAINER WITH SAME

(75) Inventor: Gianfranco D'Amato, Arzano Napoli (IT)

(73) Assignee: Seda S.p.A., Arzano Napoli (IT)

( * ) Notice: Subject to any disclaimer, the term of this patent is extended or adjusted under 35 U.S.C. 154(b) by 1025 days.

(21) Appl. No.: 12/093,497

(22) PCT Filed: Oct. 13, 2006

(86) PCT No.: PCT/EP2006/009933
§ 371 (c)(1), (2), (4) Date: Oct. 7, 2008

(87) PCT Pub. No.: WO2007/054179
PCT Pub. Date: May 18, 2007

(65) Prior Publication Data

US 2011/0174656 A1 Jul. 21, 2011

(30) Foreign Application Priority Data

Nov. 14, 2005 (EP) .................................... 05024836

(51) Int. Cl.
*B29C 43/04* (2006.01)

(52) U.S. Cl. ..................... 425/387.1; 425/392; 425/393; 425/398; 425/423

(58) Field of Classification Search .......... 425/383–394, 425/406–407, 423, 416, 292, 340, 397, 398
See application file for complete search history.

(56) References Cited

U.S. PATENT DOCUMENTS 23,200 A 3/1859 Stimpson
1,031,514 A 7/1912 Bjorkstam et al.
(Continued)

FOREIGN PATENT DOCUMENTS

AR 047625 2/2006
AT 141212 T 8/1996
(Continued)

OTHER PUBLICATIONS

Statement of case in opposition to New Zealand Patent Application No. 543602, Mar. 22, 2007, 79 pages.

(Continued)

*Primary Examiner* — Richard Crispino
*Assistant Examiner* — Thukhanh Nguyen
(74) *Attorney, Agent, or Firm* — Fish & Richardson P.C.

(57) ABSTRACT

Device (1) for producing a stacking projection (2) on the inner side (3) of a container wall (4) comprises a splaying mandrel (5) and a support ring (S) open at the top. Those are movable relative to one another between a standby position (7) and a deformation position (8). The splaying mandrel comprises at least in some places a retaining indentation (9) running externally circumferentially and the support ring comprises at least in some places a notch projection (10) running internally circumferentially. Through the interaction of those indentation and projection in the deformation position the stacking projection can be produced, wherein in the deformation a gap width (11) between in particular the retaining indentation and the notch projection in a border section (12) of the circumference is greater than the gap width (13) between the other circumferential sections (14). The corresponding container (33) comprises an inner wall (34) and an outer wall (35), in each case narrowing conically downwards The walls are at least joined together at the upper edge (36) of the container, wherein on the inner side (53) of the inner wall a denesting means (40), protruding inwards, is formed as a stacking projection. On that, another container when inserted in the container is supported. A distance between said stacking projection and the bottom (46) of the projection, is at least slightly larger than a distance between said bottom and a potential contact starting point at which the outer container when inserted in the inner container starts to contact the inner side of the inner wall of the inner container.

19 Claims, 7 Drawing Sheets

Figure 1:
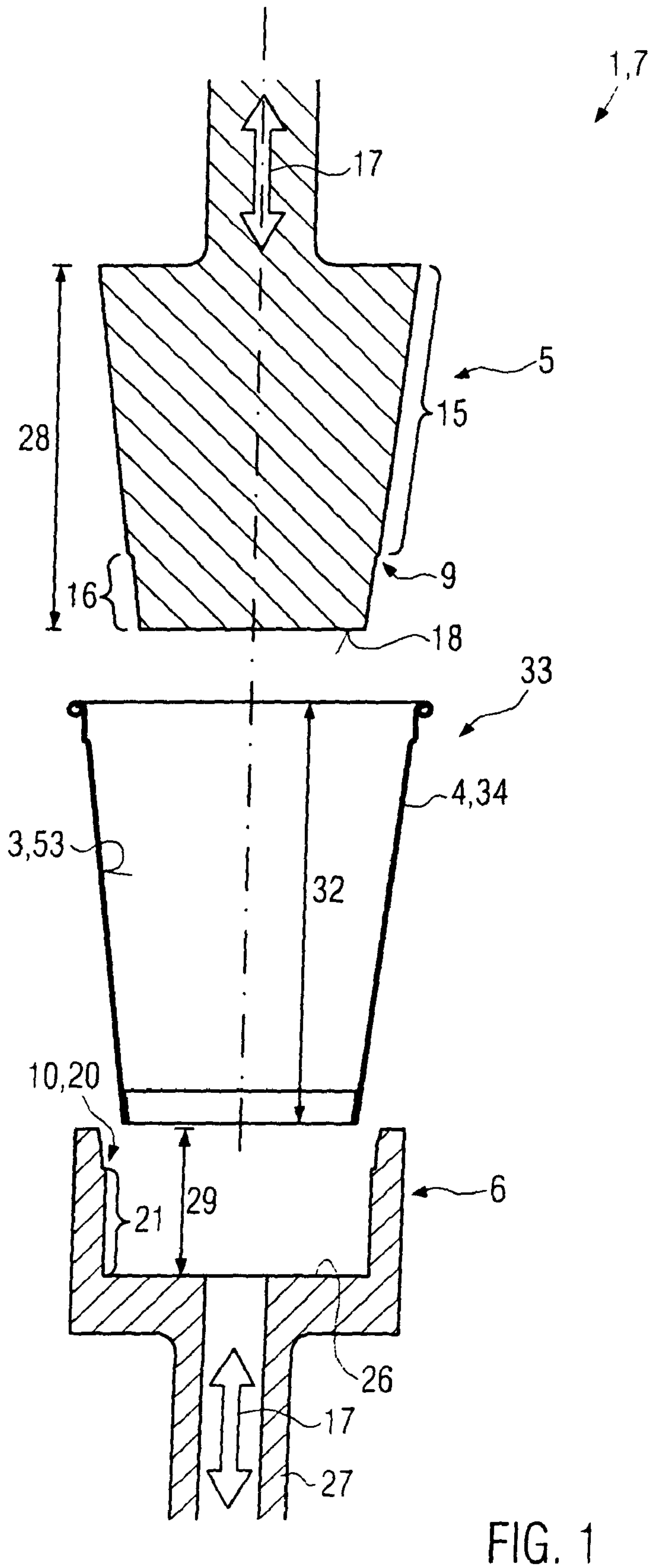

U.S. PATENT DOCUMENTS 1,520,870 A 12/1924 Koch
1,549,417 A 8/1925 Hendrich
1,615,319 A 1/1927 Wynn
1,654,318 A 12/1927 Benson
1,685,494 A 9/1928 Koch
1,706,910 A 3/1929 Wright et al.
1,756,243 A 4/1930 Benson
1,759,407 A 5/1930 Kingsbury
1,814,671 A 7/1931 Dufour
2,053,726 A 9/1936 Marshall
2,134,427 A 10/1938 Biderman
2,156,328 A 5/1939 Barbieri
2,157,054 A 5/1939 Gammeter
2,288,602 A 5/1939 Benton
2,170,060 A 8/1939 Meyer
2,216,331 A 10/1940 Swallow et al.
2,226,340 A 12/1940 Flood
2,235,963 A 3/1941 McGirr et al.
2,240,599 A 5/1941 Amberg
2,266,828 A 12/1941 Sykes
2,416,813 A 3/1947 Barbieri
2,462,497 A 2/1949 Heyman
2,493,633 A 1/1950 Mart
2,563,352 A 8/1951 Morse
2,591,578 A 4/1952 McNealy et al.
2,661,889 A 12/1953 Phinney
2,666,542 A 1/1954 Price
2,675,954 A 4/1954 Vogel
2,689,424 A 9/1954 Clagett
2,692,722 A 10/1954 Johnson
2,695,744 A 11/1954 Gattuso
2,721,686 A 10/1955 Reifsnyder et al.
2,725,733 A 12/1955 Howlett
2,740,575 A 4/1956 Fontaine
2,828,903 A 4/1958 Adkins
2,863,585 A 12/1958 Meshberg
2,888,861 A 6/1959 Meyer-Jagensberg
2,899,098 A 8/1959 Gits
2,982,465 A 5/1961 Fallert
3,065,875 A 11/1962 Negoro
3,082,900 A 3/1963 Goodman
3,109,252 A 11/1963 Schellenberg
3,079,027 A 12/1963 Edwards
3,118,351 A 1/1964 Meyer-Jagensberg
3,139,213 A 6/1964 Edwards
RE25,618 E 7/1964 Goodman
3,208,631 A 9/1965 Edwards
3,225,954 A 12/1965 Herrick et al.
3,232,512 A 2/1966 Wanderer
3,298,893 A 1/1967 Allen
3,355,046 A 11/1967 Jolly
3,357,053 A 12/1967 Lyons et al.
3,372,830 A 3/1968 Edwards
3,401,862 A 9/1968 Wanderer
3,428,214 A 2/1969 Leon
3,443,714 A 5/1969 Edwards
3,444,282 A * 5/1969 Burkett ......................... 425/293
3,456,860 A 7/1969 Janninck
3,471,075 A 10/1969 Wolf
3,485,412 A 12/1969 Hawley
3,526,316 A 9/1970 Kalogris
3,531,015 A 9/1970 Makin
3,580,468 A 5/1971 McDevitt
3,583,596 A 6/1971 Brewer
3,612,346 A 10/1971 Schneider et al.
3,645,758 A 2/1972 MacManus
3,700,018 A 10/1972 Goglio
3,737,093 A 6/1973 Amberg et al.
3,739,975 A 6/1973 Davidow
3,747,830 A 7/1973 Goldman
3,749,277 A 7/1973 Kinney
3,765,559 A 10/1973 Sauey et al.
3,766,975 A 10/1973 Todd
D231,068 S 4/1974 Douglas
3,836,207 A 9/1974 Belart
3,846,207 A 11/1974 MacDaniel et al.
3,850,361 A 11/1974 Day et al.
3,878,282 A 4/1975 Bonis et al.
3,884,350 A 5/1975 Johansson
3,908,523 A 9/1975 Shikaya
3,919,368 A * 11/1975 Seto ............................ 264/45.1
3,926,361 A 12/1975 Hilderbrand
3,927,766 A 12/1975 Day
3,934,749 A 1/1976 Andrulionis
3,955,697 A 5/1976 Valyi
3,980,107 A 9/1976 Barnes et al.
4,007,670 A 2/1977 Albano et al.
4,018,904 A 4/1977 Muraoka
4,040,537 A 8/1977 Edwards
4,049,122 A 9/1977 Maxwell
4,070,953 A 1/1978 Richards et al.
4,089,358 A 5/1978 Korson
4,102,454 A 7/1978 Karevaara et al.
4,124,120 A 11/1978 Day
4,129,065 A 12/1978 Corse et al.
4,171,085 A 10/1979 Doty
4,187,768 A 2/1980 Suzuki
4,211,024 A 7/1980 Nickell
4,231,476 A 11/1980 Compton et al.
4,261,501 A 4/1981 Watkins et al.
4,292,194 A 9/1981 Perazzoni et al.
4,308,679 A 1/1982 Ray, III et al.
4,318,235 A 3/1982 Augeri
4,324,338 A 4/1982 Beall
4,327,136 A 4/1982 Thompson et al.
4,344,814 A 8/1982 McLaren
4,345,393 A 8/1982 Price et al.
4,368,818 A 1/1983 Day et al.
4,409,045 A 10/1983 Busse
4,409,122 A 10/1983 Kleuskens et al.
4,514,242 A 4/1985 MacLaughlin et al.
4,548,348 A 10/1985 Clements
4,551,365 A 11/1985 Bonis
4,560,075 A 12/1985 Lu
4,571,233 A 2/1986 Konzal
4,574,987 A 3/1986 Halligan et al.
4,581,003 A 4/1986 Ito et al.
4,684,553 A 8/1987 Sasaki et al.
4,706,873 A 11/1987 Schulz
4,771,911 A 9/1988 Morony et al.
4,775,523 A 10/1988 Sparacio et al.
4,789,073 A 12/1988 Fine
4,792,042 A 12/1988 Koehn et al.
4,813,862 A 3/1989 Bowers et al.
4,838,424 A 6/1989 Petzelt
4,850,496 A 7/1989 Rudell et al.
4,863,014 A 9/1989 Summons et al.
4,936,448 A 6/1990 Holloway
4,955,503 A 9/1990 Propes
4,993,580 A 2/1991 Smith
4,997,691 A 3/1991 Parkinson
5,007,578 A 4/1991 Simone
5,021,274 A 6/1991 Beck et al.
5,025,981 A 6/1991 Schellenberg
5,062,568 A 11/1991 Hill et al.
5,076,463 A 12/1991 McGraw
5,078,313 A 1/1992 Matheson et al.
5,092,485 A 3/1992 Lee
5,135,132 A 8/1992 Potochnik
5,145,107 A 9/1992 Silver et al.
5,226,585 A 7/1993 Varano
5,253,781 A 10/1993 Van Melle et al.
5,363,982 A 11/1994 Sadlier
5,385,260 A 1/1995 Gatcomb
5,395,005 A 3/1995 Yoshida
5,425,497 A 6/1995 Sorensen
5,425,498 A 6/1995 Hallam et al.
5,460,323 A 10/1995 Titus
5,484,167 A 1/1996 Donaldson et al.
5,489,063 A 2/1996 Buchalski et al.
5,524,817 A 6/1996 Meier et al.
5,542,599 A 8/1996 Sobol
5,547,124 A 8/1996 Mueller
5,551,592 A 9/1996 Barton et al.
5,553,735 A 9/1996 Kimura
5,573,141 A 11/1996 Chen
5,586,689 A 12/1996 D'Amato et al.

| | | | |
|---|---|---|---|
| 5,593,053 | A | 1/1997 | Kaufman et al. |
| 5,603,450 | A | 2/1997 | Whitnell |
| 5,628,453 | A | 5/1997 | MacLaughlin |
| 5,660,326 | A | 8/1997 | Varano et al. |
| 5,660,898 | A | 8/1997 | Calvert |
| 5,671,353 | A | 9/1997 | Tian et al. |
| 5,674,546 | A | 10/1997 | Barnes et al. |
| 5,678,725 | A | 10/1997 | Yamada et al. |
| 5,685,480 | A | 11/1997 | Choi |
| 5,697,550 | A | 12/1997 | Varano et al. |
| 5,713,512 | A | 2/1998 | Barrett |
| 5,752,653 | A | 5/1998 | Razzaghi |
| RE35,830 | E | 6/1998 | Sadlier |
| 5,769,262 | A | 6/1998 | Yamada et al. |
| 5,769,311 | A | 6/1998 | Morita et al. |
| 5,772,111 | A | 6/1998 | Kirsch |
| 5,794,843 | A | 8/1998 | Sanchez |
| 5,820,016 | A | 10/1998 | Stropkay |
| 5,823,948 | A | 10/1998 | Ross, Jr. et al. |
| 5,839,599 | A | 11/1998 | Lin |
| 5,839,653 | A | 11/1998 | Zadravetz |
| 5,894,948 | A | 4/1999 | Yeh |
| 5,903,889 | A | 5/1999 | de la Huerga et al. |
| 5,913,449 | A | 6/1999 | Branch et al. |
| 5,918,761 | A | 7/1999 | Wissinger |
| 5,944,208 | A | 8/1999 | Gale |
| 5,950,917 | A | 9/1999 | Smith |
| 5,953,419 | A | 9/1999 | Lohstroh et al. |
| 5,954,217 | A | 9/1999 | Brkovic et al. |
| 5,956,400 | A | 9/1999 | Chaum et al. |
| 5,964,400 | A | 10/1999 | Varano et al. |
| 5,975,344 | A | 11/1999 | Stevens |
| 5,996,887 | A | 12/1999 | Cai et al. |
| 6,036,801 | A | 3/2000 | Yamada et al. |
| 6,047,488 | A | 4/2000 | Tuszkiewicz |
| 6,050,443 | A | 4/2000 | Tung |
| 6,056,144 | A | 5/2000 | Strange et al. |
| 6,065,632 | A | 5/2000 | Moore, Jr. |
| 6,068,181 | A | 5/2000 | Cai |
| 6,076,699 | A | 6/2000 | Seager et al. |
| 6,085,970 | A | 7/2000 | Sadlier |
| 6,109,518 | A | 8/2000 | Mueller et al. |
| 6,116,503 | A | 9/2000 | Varano |
| 6,126,584 | A | 10/2000 | Zadravetz |
| 6,145,656 | A | 11/2000 | Marco |
| 6,148,342 | A | 11/2000 | Ho |
| 6,161,720 | A | 12/2000 | Castle |
| 6,193,098 | B1 | 2/2001 | Mochizuki et al. |
| 6,196,454 | B1 | 3/2001 | Sadlier |
| 6,210,766 | B1 | 4/2001 | McLaughlin |
| 6,224,954 | B1 | 5/2001 | Mitchell et al. |
| 6,237,845 | B1 | 5/2001 | Hashimoto et al. |
| 6,253,995 | B1 | 7/2001 | Blok et al. |
| 6,257,485 | B1 | 7/2001 | Sadlier et al. |
| 6,260,021 | B1 | 7/2001 | Wong et al. |
| 6,260,756 | B1 | 7/2001 | Mochizuki et al. |
| 6,263,330 | B1 | 7/2001 | Bessette et al. |
| 6,265,040 | B1 | 7/2001 | Neale et al. |
| 6,286,754 | B1 | 9/2001 | Stier et al. |
| 6,287,247 | B1 | 9/2001 | Dees et al. |
| 6,315,150 | B1 | 11/2001 | Takai et al. |
| 6,315,192 | B1 | 11/2001 | Marlow |
| 6,332,538 | B1 | 12/2001 | Pritchard |
| 6,343,735 | B1 | 2/2002 | Cai |
| 6,367,652 | B1 | 4/2002 | Toida et al. |
| 6,378,763 | B1 | 4/2002 | Nelson et al. |
| 6,378,766 | B2 | 4/2002 | Sadlier |
| 6,382,449 | B1 | 5/2002 | Kazmierski et al. |
| 6,401,955 | B1 | 6/2002 | Yang et al. |
| 6,419,108 | B1 | 7/2002 | Toida et al. |
| 6,422,456 | B1 | 7/2002 | Sadlier |
| 6,424,996 | B1 | 7/2002 | Killcommons et al. |
| 6,449,621 | B1 | 9/2002 | Pettovello |
| 6,457,585 | B1 | 10/2002 | Huffer et al. |
| 6,463,417 | B1 | 10/2002 | Schoenberg |
| 6,557,102 | B1 | 4/2003 | Wong et al. |
| 6,557,751 | B2 | 5/2003 | Puerini |
| 6,562,270 | B1 | 5/2003 | Gannon et al. |
| 6,568,587 | B1 | 5/2003 | Yamada et al. |
| 6,574,629 | B1 | 6/2003 | Cooke, Jr. et al. |
| 6,574,742 | B1 | 6/2003 | Jamroga et al. |
| 6,598,786 | B1 | 7/2003 | Guo |
| 6,611,846 | B1 | 8/2003 | Stoodley et al. |
| 6,612,456 | B1 | 9/2003 | Hundley et al. |
| 6,648,176 | B1 | 11/2003 | Donovan |
| 6,651,060 | B1 | 11/2003 | Harper et al. |
| 6,663,926 | B1 | 12/2003 | Okushita et al. |
| 6,678,703 | B2 | 1/2004 | Rothschild et al. |
| 6,678,764 | B2 | 1/2004 | Parvulescu et al. |
| 6,688,487 | B2 | 2/2004 | Oakes et al. |
| 6,691,134 | B1 | 2/2004 | Babula et al. |
| 6,738,798 | B1 | 5/2004 | Ploetz et al. |
| 6,746,743 | B2 | 6/2004 | Knoerzer et al. |
| 6,749,913 | B2 | 6/2004 | Watanabe et al. |
| 6,763,344 | B1 | 7/2004 | Osentoski et al. |
| 6,775,670 | B2 | 8/2004 | Bessette |
| 6,811,843 | B2 | 11/2004 | DeBraal et al. |
| 6,852,381 | B2 | 2/2005 | Debraal et al. |
| 6,908,651 | B2 | 6/2005 | Watanabe et al. |
| 6,921,179 | B2 | 7/2005 | Diak Ghanem |
| 6,926,197 | B2 | 8/2005 | Hed et al. |
| 6,989,198 | B2 | 1/2006 | Masuda et al. |
| 7,100,770 | B2 | 9/2006 | D'Amato |
| 7,117,579 | B2 | 10/2006 | Schellenberg |
| 7,172,086 | B2 | 2/2007 | McKendry et al. |
| 7,175,585 | B2 | 2/2007 | Okushita et al. |
| 7,195,805 | B2 | 3/2007 | Breining et al. |
| D546,625 | S | 7/2007 | Gluck |
| D547,122 | S | 7/2007 | Gluck |
| D550,033 | S | 9/2007 | Bodum |
| D550,034 | S | 9/2007 | Bodum |
| D551,502 | S | 9/2007 | Bodum |
| D553,437 | S | 10/2007 | Bodum |
| D553,439 | S | 10/2007 | Bodum |
| D553,440 | S | 10/2007 | Bodum |
| D553,442 | S | 10/2007 | Bodum |
| D553,909 | S | 10/2007 | Bodum |
| D553,910 | S | 10/2007 | Bodum |
| D553,911 | S | 10/2007 | Bodum |
| 7,281,650 | B1 | 10/2007 | Milan |
| D557,561 | S | 12/2007 | Flowers et al. |
| D557,563 | S | 12/2007 | Bodum |
| D557,564 | S | 12/2007 | Bodum |
| 7,306,113 | B2 | 12/2007 | El-Saden et al. |
| D562,075 | S | 2/2008 | Mehta |
| D563,172 | S | 3/2008 | Bodum |
| 7,344,038 | B2 | 3/2008 | Elansary |
| D577,260 | S | 9/2008 | Bodum |
| 7,451,910 | B2 | 11/2008 | Frost et al. |
| 7,451,911 | B2 | 11/2008 | Stepanek, Jr. |
| D581,738 | S | 12/2008 | Bodum |
| D581,739 | S | 12/2008 | Bodum |
| 7,458,504 | B2 | 12/2008 | Robertson et al. |
| 7,481,356 | B2 | 1/2009 | Stahlecker et al. |
| 7,536,767 | B2 | 5/2009 | Hollis et al. |
| D594,277 | S | 6/2009 | Snell |
| D595,090 | S | 6/2009 | Benson |
| 7,552,841 | B2 | 6/2009 | Hollis et al. |
| D597,791 | S | 8/2009 | Lion et al. |
| D597,792 | S | 8/2009 | Lion et al. |
| 7,597,246 | B2 | 10/2009 | Stepanek, Jr. |
| 7,631,781 | B2 | 12/2009 | Chen |
| 7,677,435 | B2 | 3/2010 | Stahlecker |
| 7,694,843 | B2 | 4/2010 | Hollis et al. |
| 7,699,216 | B2 | 4/2010 | Smith et al. |
| 7,717,325 | B2 | 5/2010 | Puls et al. |
| 2001/0013537 | A1 | 8/2001 | Sadlier |
| 2001/0032100 | A1 | 10/2001 | Mahmud et al. |
| 2001/0041991 | A1 | 11/2001 | Segal et al. |
| 2002/0010679 | A1 | 1/2002 | Felsher |
| 2002/0043555 | A1 | 4/2002 | Mader |
| 2002/0148832 | A1 | 10/2002 | Breining et al. |
| 2002/0156650 | A1 | 10/2002 | Klein et al. |
| 2002/0172818 | A1 | 11/2002 | DeBraal et al. |
| 2003/0029876 | A1 | 2/2003 | Giraud |
| 2003/0088441 | A1 | 5/2003 | McNerney |
| 2003/0116576 | A1 | 6/2003 | Lang-Boecker |
| 2003/0121189 | A1 | 7/2003 | Williams |

| | | | |
|---|---|---|---|
| 2003/0121963 | A1 | 7/2003 | Van Handel |
| 2003/0140044 | A1 | 7/2003 | Mok et al. |
| 2003/0226882 | A1 | 12/2003 | Porchia et al. |
| 2004/0034550 | A1 | 2/2004 | Menschik et al. |
| 2004/0069311 | A1 | 4/2004 | Sasaki et al. |
| 2004/0094612 | A1 | 5/2004 | D'Amato |
| 2004/0112949 | A1 | 6/2004 | Hed et al. |
| 2004/0133797 | A1 | 7/2004 | Arnold |
| 2004/0139222 | A1 | 7/2004 | Slik et al. |
| 2004/0154156 | A1 | 8/2004 | Schellenberg |
| 2004/0199765 | A1 | 10/2004 | Kohane et al. |
| 2004/0226948 | A1 | 11/2004 | Okushita et al. |
| 2005/0006385 | A1 | 1/2005 | D'Amato |
| 2005/0029337 | A1 | 2/2005 | Van Handel |
| 2005/0040218 | A1 | 2/2005 | Hinchey et al. |
| 2005/0045643 | A1 | 3/2005 | Ghanem |
| 2005/0115975 | A1 | 6/2005 | Smith et al. |
| 2005/0184074 | A1 | 8/2005 | Simmons et al. |
| 2005/0199697 | A1 | 9/2005 | Nugent |
| 2005/0205651 | A1 | 9/2005 | Marx |
| 2005/0236468 | A1 | 10/2005 | Sadlier |
| 2005/0258225 | A1 | 11/2005 | Martin |
| 2005/0269390 | A1 | 12/2005 | Martin |
| 2006/0038001 | A1 | 2/2006 | Stepanek |
| 2006/0118608 | A1 | 6/2006 | Stahlecker |
| 2006/0131316 | A1 | 6/2006 | Bresler |
| 2006/0144915 | A1 | 7/2006 | Sadlier |
| 2006/0186012 | A1 | 8/2006 | D'Amato |
| 2006/0226210 | A1 | 10/2006 | Stahlecker |
| 2006/0237465 | A1 | 10/2006 | D'Amato |
| 2006/0283855 | A1 | 12/2006 | Hollis et al. |
| 2006/0289610 | A1 | 12/2006 | Kling |
| 2007/0262129 | A1 | 11/2007 | Zadravetz |
| 2007/0284426 | A1 | 12/2007 | Lo |
| 2008/0006643 | A1 | 1/2008 | Ma |
| 2008/0023536 | A1 | 1/2008 | Frost et al. |
| 2008/0023537 | A1 | 1/2008 | Frost et al. |
| 2008/0023538 | A1 | 1/2008 | Robertson et al. |
| 2008/0029588 | A1 | 2/2008 | Messerschmid et al. |
| 2008/0078825 | A1 | 4/2008 | Puls et al. |
| 2008/0087677 | A1 | 4/2008 | Robertson et al. |
| 2008/0087715 | A1 | 4/2008 | Robertson et al. |
| 2008/0087716 | A1 | 4/2008 | Sadlier |
| 2008/0093434 | A1 | 4/2008 | Van Handel |
| 2008/0105692 | A1 | 5/2008 | Hiromori |
| 2008/0105693 | A1 | 5/2008 | Hechmati |
| 2008/0121681 | A1 | 5/2008 | Wiedmeyer |
| 2008/0128433 | A1 | 6/2008 | Stauffer et al. |
| 2008/0128481 | A1 | 6/2008 | Robertson |
| 2008/0156857 | A1 | 7/2008 | Johnston |
| 2008/0169297 | A1 | 7/2008 | Kelly |
| 2008/0264937 | A1 | 10/2008 | D'Amato |
| 2008/0272118 | A1 | 11/2008 | Wang |
| 2008/0280743 | A1 | 11/2008 | Stahlecker et al. |
| 2008/0302800 | A1 | 12/2008 | Chou |
| 2008/0308620 | A1 | 12/2008 | Stepanek, Jr. |
| 2008/0314909 | A1 | 12/2008 | Takeo et al. |
| 2009/0020597 | A1 | 1/2009 | D'Amato |
| 2009/0110782 | A1 | 4/2009 | Mellor |
| 2009/0121007 | A1 | 5/2009 | Van Handel |
| 2009/0159653 | A1 | 6/2009 | Stahlecker |
| 2009/0166402 | A1 | 7/2009 | D'amato |
| 2009/0170680 | A1 | 7/2009 | D'amato |
| 2009/0184020 | A1 | 7/2009 | Messerschmid et al. |
| 2009/0218390 | A1 | 9/2009 | Chang |
| 2009/0230178 | A1 | 9/2009 | Stahlecker et al. |
| 2009/0294456 | A1 | 12/2009 | Messerschmid |
| 2009/0294520 | A1 | 12/2009 | Stepanek, Jr. |
| 2009/0321440 | A1 | 12/2009 | Fedusa et al. |
| 2009/0321508 | A1 | 12/2009 | Fu et al. |
| 2010/0025283 | A1 | 2/2010 | Oshima et al. |
| 2010/0044424 | A1 | 2/2010 | Van Handel |
| 2010/0065622 | A1 | 3/2010 | Chang |
| 2010/0072268 | A1 | 3/2010 | Johnson et al. |
| 2010/0160130 | A1 | 6/2010 | Messerschmid |
| 2010/0187296 | A1 | 7/2010 | Puls et al. |

FOREIGN PATENT DOCUMENTS

| | | | |
|---|---|---|---|
| AT | 263709 | T | 4/2004 |
| AU | 4557993 | A | 3/1994 |
| AU | 2008264158 | A1 | 8/2009 |
| AU | 2009200641 | A1 | 10/2009 |
| BE | 410215 | A | 7/1935 |
| BE | 897862 | A1 | 3/1984 |
| BR | PI0900078 | A2 | 9/2009 |
| CA | 742539 | | 9/1966 |
| CA | 837922 | | 3/1970 |
| CA | 844949 | | 6/1970 |
| CA | 1007182 | | 3/1977 |
| CA | 1082657 | | 7/1980 |
| CA | 1125680 | | 6/1982 |
| CA | 1125681 | | 6/1982 |
| CA | 1152011 | | 8/1983 |
| CA | 1239885 | | 8/1988 |
| CA | 1249232 | | 1/1989 |
| CA | 1257209 | | 7/1989 |
| CA | 2021035 | A1 | 1/1991 |
| CA | 2026197 | | 8/1991 |
| CA | 2060135 | | 7/1992 |
| CA | 2150306 | | 2/1996 |
| CA | 2043958 | | 7/1996 |
| CA | 2250677 | | 4/2000 |
| CA | 2286498 | A1 | 4/2000 |
| CA | 2176080 | | 8/2001 |
| CA | 2228749 | | 10/2001 |
| CA | 2141730 | | 5/2002 |
| CA | 2197976 | | 5/2002 |
| CA | 2432791 | | 6/2002 |
| CA | 2165509 | | 7/2002 |
| CA | 2436505 | A1 | 8/2002 |
| CA | 2233356 | | 11/2002 |
| CA | 2431542 | | 12/2002 |
| CA | 2431869 | | 12/2002 |
| CA | 2219845 | | 4/2003 |
| CA | 2244689 | | 9/2003 |
| CA | 2271581 | | 12/2003 |
| CA | 2121491 | | 7/2004 |
| CA | 2542905 | A1 | 1/2005 |
| CA | 2564012 | | 11/2005 |
| CA | 114070 | | 2/2006 |
| CA | 2520024 | | 3/2006 |
| CA | 2262802 | | 6/2006 |
| CA | 2549450 | | 12/2006 |
| CA | 2608826 | | 12/2006 |
| CA | 2262458 | | 1/2007 |
| CA | 2613109 | | 1/2007 |
| CA | 2621453 | | 3/2007 |
| CA | 113773 | | 4/2007 |
| CA | 119089 | | 5/2007 |
| CA | 119090 | | 5/2007 |
| CA | 119091 | | 5/2007 |
| CA | 119092 | | 5/2007 |
| CA | 2629190 | | 5/2007 |
| CA | 118452 | | 7/2007 |
| CA | 113355 | | 9/2007 |
| CA | 115931 | | 10/2007 |
| CA | 116240 | | 10/2007 |
| CA | 116241 | | 10/2007 |
| CA | 116438 | | 10/2007 |
| CA | 119239 | | 10/2007 |
| CA | 120446 | | 10/2007 |
| CA | 2545497 | | 11/2007 |
| CA | 2588413 | | 11/2007 |
| CA | 2657721 | A1 | 1/2008 |
| CA | 116480 | | 2/2008 |
| CA | 2598153 | | 2/2008 |
| CA | 120610 | | 3/2008 |
| CA | 2520677 | | 4/2008 |
| CA | 2664625 | | 4/2008 |
| CA | 2665633 | | 4/2008 |
| CA | 114549 | | 5/2008 |
| CA | 121962 | | 5/2008 |
| CA | 2610053 | | 5/2008 |
| CA | 122120 | | 6/2008 |
| CA | 122879 | | 7/2008 |
| CA | 2267361 | | 10/2008 |

| | | | |
|---|---|---|---|
| CA | 2598691 | | 5/2009 |
| CA | 2347777 | | 7/2009 |
| CA | 2706374 | | 7/2009 |
| CA | 2311825 | | 10/2009 |
| CA | 2405786 | | 11/2009 |
| CA | 2394475 | | 1/2010 |
| CA | 128485 | | 2/2010 |
| CH | 678938 | A5 | 11/1991 |
| CN | 1082987 | A | 3/1994 |
| CN | 1128744 | A | 8/1996 |
| CN | 1237133 | A | 12/1999 |
| CN | 1272089 | A | 11/2000 |
| CN | 1288427 | A | 3/2001 |
| CN | 2430371 | | 5/2001 |
| CN | 2484866 | Y | 4/2002 |
| CN | 2526274 | Y | 12/2002 |
| CN | 1489541 | A | 4/2004 |
| CN | 1781813 | A | 6/2006 |
| CN | 101489771 | A | 7/2009 |
| CN | 101492107 | A | 7/2009 |
| CN | 101531070 | A | 9/2009 |
| DE | 652737 | C | 11/1937 |
| DE | 18806777 | | 5/1963 |
| DE | 11 91 285 | A | 4/1965 |
| DE | 2001499 | | 7/1970 |
| DE | 8301046.7 | | 6/1983 |
| DE | 3335833 | A1 | 4/1984 |
| DE | 9115069 | U1 | 1/1992 |
| DE | 9215015 | U1 | 1/1993 |
| DE | 59002814 | | 10/1993 |
| DE | 4226313 | | 2/1994 |
| DE | 4393650 | | 11/1995 |
| DE | 44 21 870 | A1 | 1/1996 |
| DE | 59303454 | | 9/1996 |
| DE | 19517392 | | 11/1996 |
| DE | 19517394 | | 11/1996 |
| DE | 19840841 | A1 | 3/2000 |
| DE | 10056811 | A1 | 7/2001 |
| DE | 10054727 | A1 | 5/2002 |
| DE | 20110390 | | 10/2002 |
| DE | 20110390 | | 12/2002 |
| DE | 20310623 | U1 | 11/2003 |
| DE | 60102661 | T2 | 8/2004 |
| DE | 102004056932 | A1 | 5/2006 |
| DE | 102005017741 | A1 | 10/2006 |
| DE | 102006025612 | A1 | 11/2007 |
| DE | 102007024243 | A1 | 1/2008 |
| DE | 102007024254 | A1 | 1/2008 |
| DE | 102007030864 | A1 | 1/2008 |
| DE | 102008005403 | A1 | 7/2009 |
| DE | 102008014878 | A1 | 9/2009 |
| EA | 200900031 | A1 | 8/2009 |
| EP | 0074936 | A2 | 3/1983 |
| EP | 0 108 264 | | 10/1983 |
| EP | 0102149 | A2 | 3/1984 |
| EP | 0 371 918 | | 6/1990 |
| EP | 0408515 | A1 | 1/1991 |
| EP | 0512179 | A1 | 11/1992 |
| EP | 0653983 | A1 | 5/1995 |
| EP | 0 659 647 | | 6/1995 |
| EP | 0 683 033 | | 11/1995 |
| EP | 0 688 720 | | 12/1995 |
| EP | 0 695 692 | | 2/1996 |
| EP | 0 765 821 | | 4/1997 |
| EP | 0 812 668 | | 12/1997 |
| EP | 0929455 | | 7/1999 |
| EP | 0934202 | A1 | 8/1999 |
| EP | 0 940 240 | | 9/1999 |
| EP | 1 029 656 | | 8/2000 |
| EP | 1 031 514 | | 8/2000 |
| EP | 1031514 | | 8/2000 |
| EP | 1 060 879 | | 12/2000 |
| EP | 1057733 | A1 | 12/2000 |
| EP | 1 157 943 | | 11/2001 |
| EP | 1203728 | A2 | 5/2002 |
| EP | 1 227 042 | | 7/2002 |
| EP | 1 227 043 | | 7/2002 |
| EP | 1 227 043 | A1 | 7/2002 |
| EP | 1227042 | | 7/2002 |
| EP | 1227042 | A1 | 7/2002 |
| EP | 1 254 842 | | 11/2002 |
| EP | 1 317 380 | | 6/2003 |
| EP | 1 404 580 | | 4/2004 |
| EP | 1 404 590 | | 4/2004 |
| EP | 1 418 272 | | 5/2004 |
| EP | 1 463 670 | | 10/2004 |
| EP | 1479512 | A2 | 11/2004 |
| EP | 1 486 424 | | 12/2004 |
| EP | 1 512 527 | | 3/2005 |
| EP | 1 547 762 | | 6/2005 |
| EP | 1 637 457 | | 3/2006 |
| EP | 1 670 688 | | 6/2006 |
| EP | 1 712 490 | | 10/2006 |
| EP | 1712490 | A2 | 10/2006 |
| EP | 1714912 | | 10/2006 |
| EP | 1 719 715 | | 11/2006 |
| EP | 1 739 029 | | 1/2007 |
| EP | 1785370 | A1 | 5/2007 |
| EP | 1 876 106 | | 1/2008 |
| EP | 1 894 847 | | 3/2008 |
| EP | 1 921 023 | | 5/2008 |
| EP | 1 939 099 | | 7/2008 |
| EP | 1975083 | A2 | 10/2008 |
| EP | 1 990 184 | | 11/2008 |
| EP | 2 128 041 | | 1/2009 |
| EP | 2 049 326 | | 4/2009 |
| EP | 2043853 | A1 | 4/2009 |
| EP | 2 080 715 | | 7/2009 |
| EP | 2080715 | A1 | 7/2009 |
| EP | 2108506 | A2 | 10/2009 |
| EP | 2 147 871 | | 1/2010 |
| EP | 2 199 222 | | 6/2010 |
| EP | 2 202 178 | | 6/2010 |
| ES | 2045882 | T3 | 1/1994 |
| ES | 2093443 | T3 | 12/1996 |
| ES | 2218361 | T3 | 11/2004 |
| FR | 791981 | A | 12/1935 |
| FR | 14 90 636 | | 6/1967 |
| FR | 2160489 | A1 | 6/1973 |
| FR | 2533894 | | 4/1984 |
| FR | 2825981 | | 6/2001 |
| FR | 2813861 | A1 | 3/2002 |
| GB | 321176 | A | 10/1929 |
| GB | 0445661 | A | 4/1936 |
| GB | 484990 | A | 5/1938 |
| GB | 1 261 533 | | 1/1968 |
| GB | 1261531 | | 1/1972 |
| GB | 1261532 | | 1/1972 |
| GB | 1261533 | | 1/1972 |
| GB | 2016640 | | 9/1979 |
| GB | 1 554 241 | | 10/1979 |
| GB | 2 044 076 | | 10/1980 |
| GB | 2 055 737 | | 3/1981 |
| GB | 2 061 699 | | 5/1981 |
| GB | 2 073 581 | | 10/1981 |
| GB | 2074124 | A | 10/1981 |
| GB | 2 077 177 | | 12/1981 |
| GB | 2 078 094 | | 1/1982 |
| GB | 2130168 | A | 5/1984 |
| GB | 2333087 | A | 7/1999 |
| GB | 2359295 | | 8/2001 |
| GB | 2 420 267 | A | 5/2006 |
| GB | 2425041 | A | 10/2006 |
| GB | 2426045 | A | 11/2006 |
| GB | 2445287 | A | 7/2008 |
| HK | 1034700 | A1 | 4/2004 |
| HK | 1063172 | A1 | 8/2006 |
| IT | 1366725 | | 2/2006 |
| IT | MI0020060589 | | 6/2006 |
| JP | 50-67002 | | 10/1948 |
| JP | 52-76459 | | 11/1950 |
| JP | 50052003 | A | 5/1975 |
| JP | 50-120802 | | 10/1975 |
| JP | 50120802 | A | 10/1975 |
| JP | 51-140989 | | 12/1976 |
| JP | 51140989 | | 12/1976 |
| JP | 53-060441 | | 5/1978 |
| JP | 53060441 | | 5/1978 |

| | | | |
|---|---|---|---|
| JP | 55-134046 | | 10/1980 |
| JP | 55-134046 | A | 10/1980 |
| JP | 56156777 | A | 11/1981 |
| JP | 58-81159 | | 5/1983 |
| JP | 59-94076 | | 5/1984 |
| JP | 60-154235 | | 8/1985 |
| JP | 60-242490 | | 12/1985 |
| JP | 62-143663 | | 6/1987 |
| JP | 2509655 | Y2 | 8/1989 |
| JP | 2-307738 | | 12/1990 |
| JP | 3023014 | U | 3/1991 |
| JP | 4-32908 | | 2/1992 |
| JP | 4097833 | | 3/1992 |
| JP | 4-45215 | | 4/1992 |
| JP | 4-68848 | | 6/1992 |
| JP | 5-84621 | | 11/1993 |
| JP | 06048474 | A | 2/1994 |
| JP | 07-149338 | | 6/1995 |
| JP | 8-207924 | | 8/1996 |
| JP | 8-310571 | | 11/1996 |
| JP | 9-132224 | | 5/1997 |
| JP | 10-175627 | | 6/1998 |
| JP | 10-278931 | | 10/1998 |
| JP | 10-338277 | | 12/1998 |
| JP | 11 314286 | A | 11/1999 |
| JP | 11321936 | A | 11/1999 |
| JP | 11342982 | A | 12/1999 |
| JP | 2000033931 | | 2/2000 |
| JP | 2000-095228 | | 4/2000 |
| JP | 2000-103478 | | 4/2000 |
| JP | 2000-103479 | | 4/2000 |
| JP | 200118520 | | 4/2000 |
| JP | 2000095228 | | 4/2000 |
| JP | 2000103478 | | 4/2000 |
| JP | 2000103479 | | 4/2000 |
| JP | 2000118520 | | 4/2000 |
| JP | 3063644 | | 5/2000 |
| JP | 2000-190943 | | 7/2000 |
| JP | 2000-203664 | | 7/2000 |
| JP | 2000190943 | | 7/2000 |
| JP | 2000203664 | | 7/2000 |
| JP | 2000-238739 | | 9/2000 |
| JP | 2000-281044 | | 10/2000 |
| JP | 2000281044 | | 10/2000 |
| JP | 2001-2051 | | 1/2001 |
| JP | 01-98355 | | 4/2001 |
| JP | 2001097355 | | 4/2001 |
| JP | 2001171642 | | 6/2001 |
| JP | 2001180647 | | 7/2001 |
| JP | 2001293802 | | 10/2001 |
| JP | 2001294282 | | 10/2001 |
| JP | 3248718 | A | 2/2002 |
| JP | 3274412 | A | 4/2002 |
| JP | 2002-128049 | | 5/2002 |
| JP | 2003-276721 | A | 10/2003 |
| JP | 2004-90929 | A | 3/2004 |
| JP | 2004090928 | A | 3/2004 |
| JP | 2004-1892 | | 4/2004 |
| JP | 2004-98663 | | 4/2004 |
| JP | 2004-99079 | | 4/2004 |
| JP | 2004522654 | T | 7/2004 |
| JP | 2004-314987 | | 11/2004 |
| JP | 2004315065 | | 11/2004 |
| JP | 2006143331 | A | 6/2006 |
| JP | 2008-529549 | | 8/2008 |
| JP | 2009173346 | A | 8/2009 |
| KR | 2006056859 | | 5/2006 |
| NL | 42544 | C | 2/1938 |
| NZ | 506739 | | 11/2001 |
| NZ | 519160 | | 12/2003 |
| SG | 0117419 | A1 | 12/2005 |
| TR | 200400866 | T4 | 6/2004 |
| TW | 393427 | B | 6/2000 |
| TW | 399609 | Y | 7/2000 |
| WO | WO 93/08084 | | 4/1993 |
| WO | 9403326 | A1 | 2/1994 |
| WO | 9832601 | A2 | 7/1998 |
| WO | 9911526 | A1 | 3/1999 |
| WO | 9922686 | A1 | 5/1999 |
| WO | 9959883 | A1 | 11/1999 |
| WO | 0017058 | A1 | 3/2000 |
| WO | 0028288 | A1 | 5/2000 |
| WO | WO 01/38180 | | 5/2001 |
| WO | WO-0204300 | | 1/2002 |
| WO | WO 02/30783 | | 4/2002 |
| WO | 0247523 | A1 | 6/2002 |
| WO | WO 02/49924 | | 6/2002 |
| WO | WO 02/060767 | A1 | 8/2002 |
| WO | WO-03057577 | | 7/2003 |
| WO | WO 2004/103845 | | 12/2004 |
| WO | WO 2005/012114 | | 2/2005 |
| WO | WO 2005/047126 | | 5/2005 |
| WO | 2005054082 | A1 | 6/2005 |
| WO | WO 2005/053487 | | 6/2005 |
| WO | 2005075319 | A1 | 8/2005 |
| WO | 2005100167 | A1 | 10/2005 |
| WO | WO 2005/102847 | | 11/2005 |
| WO | 2007028623 | A1 | 3/2007 |
| WO | WO 2007/036928 | A3 | 4/2007 |
| WO | 2007054179 | A2 | 5/2007 |
| WO | 2007054318 | A1 | 5/2007 |
| WO | WO 2007/054179 | A2 | 5/2007 |
| WO | WO 2007/078446 | A2 | 7/2007 |
| WO | WO 2007/090415 | A1 | 8/2007 |
| WO | WO 2007/091068 | A2 | 8/2007 |
| WO | WO 2007/094838 | A2 | 8/2007 |
| WO | WO 2007/126783 | A1 | 11/2007 |
| WO | 2008009371 | A1 | 1/2008 |
| WO | 2008009372 | A1 | 1/2008 |
| WO | WO 2008/009371 | | 1/2008 |
| WO | WO 2008/009372 | A1 | 1/2008 |
| WO | WO 2008/014230 | | 1/2008 |
| WO | WO 2008/022180 | A2 | 2/2008 |
| WO | WO 2008/026161 | A2 | 3/2008 |
| WO | WO 2008/042378 | | 4/2008 |
| WO | WO 2008/045708 | A1 | 4/2008 |
| WO | WO 2008/045944 | A2 | 4/2008 |
| WO | 2008067865 | A1 | 6/2008 |
| WO | WO 2008/107657 | A1 | 9/2008 |
| WO | WO 2008/119938 | A1 | 10/2008 |
| WO | WO 2008/123783 | A1 | 10/2008 |
| WO | WO 2008/146115 | A1 | 12/2008 |
| WO | WO 2009/021305 | A2 | 2/2009 |
| WO | WO 2009/032837 | A1 | 3/2009 |
| WO | WO 2009/034323 | A2 | 3/2009 |
| WO | WO 2009/039632 | A1 | 4/2009 |
| WO | WO 2009/059352 | A1 | 5/2009 |
| WO | WO 2009/074285 | A2 | 6/2009 |
| WO | 2009092557 | A1 | 7/2009 |
| WO | WO 2009/082660 | A1 | 7/2009 |
| WO | WO 2009/092557 | | 7/2009 |
| WO | WO 2009/118772 | A1 | 10/2009 |
| WO | WO 2010/008629 | A1 | 1/2010 |
| WO | WO 2010/011627 | A1 | 1/2010 |
| WO | WO 2010/019146 | A1 | 2/2010 |
| WO | WO 2010/031764 | A2 | 3/2010 |
| WO | WO 2010/034869 | A1 | 4/2010 |
| WO | WO 2010/036645 | A1 | 4/2010 |
| WO | WO 2010/067047 | A1 | 6/2010 |

OTHER PUBLICATIONS

Statement of case in support of Notice of Opposition to Grant of Patent (Section 21) in New Zealand Patent Application No. 543602, Mar. 28, 2007, 16 pages.

International Search Report from International Application No. PCT/EP2006/009933, dated Oct. 4, 2007, 5 pages.

International Search Report mailed Jan. 15, 2007 in PCT/EP2006/008753.

Decision—Minutes of the oral proceedings before the Opposition Division in EP-B-1785370.

EPO Communication dated Oct. 20, 2010, based on EP1976683.

International Search Report from Corresponding International Application No. PCT/EP2006/009933, dated Oct. 4, 2007, 5 pages.

Decision—Minutes of the oral proceedings before the Opposition Divisin in EP-B-1785370.

Notice of Reasons for Rejection from the Japanese Patent Office in Japanese Patent Appln. No. 2008-539346.

Second Office Action from the State Intellectual Property Office of P.R. China, dated Mar. 21, 2011, for Appln. No. 200480025553.7, issued as 2011031600528500.
Request for Inter Partes Reexamination Under 35 U.S.C. § 331 and 37 C.F.R. §1.913 directed to U.S. Patent No. 7,481,356, filed Jun. 4, 2010 (assigned U.S. Appl. No. 95/001,370).
Order Granting/Denying Request for Inter Partes Reexamination in Reexamination U.S. Appl. No. 95/001,370, dated Jul. 23, 2010.
Office Action in Inter Partes Reexamination in Reexamination U.S. Appl. No. 95/001,370, dated Jul. 23, 2011.
Response to Office Action in Reexamination U.S. Appl. No. 95/001,370, mailed Sep. 22, 2010.
Third Party Requester Seda S.P.A. Comments After Patent Owner Response Pursuant to 37 C.F.R. §1.947 in Reexamination U.S. Appl. No. 95/001,370, filed Oct. 21, 2010.
Action Closing Prosecution in Reexamination U.S. Appl. No. 95/001,370, dated Jan. 7, 2011.
Right of Appeal Notice in Reexamination U.S. Appl. No. 95/001,370, dated Apr. 25, 2011.
European Search Report dated Sep. 30, 2010, based on EP10008013.
European Search Report dated Sep. 30, 2010, based on EP10008011.
European Search Report dated Sep. 30, 2010, based on EP10008012.
International Search Report from Corresponding International Application No. PCT/EP2005/005406, dated Aug. 25, 2005, 2 pages.
Search Report for DE 203 19 691.0 mailed Aug. 24, 2004.
European Office Action mailed Dec. 14, 2011, which issued in corresponding EP Application No. 06806275.1.

* cited by examiner

DEVICE FOR PRODUCING A STACKING PROJECTION AND CONTAINER WITH SAME

RELATED APPLICATIONS

This application is a U.S. nationalization of PCT application No. PCT/EP2006/009933 filed on Oct. 13, 2006, and claims priority to EP Patent Application No. 05024836.8 filed on Nov. 14, 2005, the contents of which are incorporated herein by reference in their entirety.

The invention relates to a device for producing a stacking projection on an inner side of a container wall and a container with a corresponding stacking projection.

A device for producing a stacking projection is for example known from EP 1 227 042 B1. With this prior art device a container is placed on a conical support element which narrows in the direction of the container. This support element exhibits a circumferential groove. At the level of this circumferential groove a knurled wheel is arranged for rotation and through a relative rotation of the support element to the knurled wheel, it engages with the corresponding groove, whereby a corresponding inner wall of the container is deformed by this engagement such that it exhibits a stacking projection which protrudes on its inner side. Then the container is removed from the supporting element and an outer wall fixed to the inner wall. In this way a double-walled container is obtained with a stacking projection on the inner side of the inner wall, thus simplifying releasing containers of this type from one another after they have been stacked together.

Due to the shape of the groove and the outer circumference of the knurled wheel the stacking projection here has a rounded-off form.

The device according to EP 1 227 042 B1 operates fast and reliably in producing the corresponding stacking projection. This also facilitates easy removal of appropriate containers from the stack without them jamming together.

With the appropriate containers it should be noted that an inner wall of such a container is generally formed from a two-dimensional blank. This is bent into an appropriate conical shape and to obtain the inner wall of the container, the ends of the blank pointing towards one another are connected in an overlapping border section. In this way the thickness of the inner wall in this section is greater than in the other sections of the wall. The joint in the overlapping border section is made for example using an adhesive or by heating a plastic film which seals against fluids and is applied to the inner wall. This different wall thickness in the overlapping border section cannot be taken into account with the device described above in the production of the stacking projection.

The object of the invention is therefore to improve a device for producing a stacking projection such that, while retaining a reliable and fast production of such a stacking projection, it takes into account a wall thickness variation of the inner wall of the container during the production of the stacking projection. At the same time the device should be simply constructed and should be able to quickly process a large number of containers for producing the stacking projection.

This object is solved by the characteristic elements of claim 1.

According to the invention the device uses a splaying mandrel and a support ring open at the top. These can move relative to one another between a standby position and a deformation position. In the standby position a container wall, i.e. in particular an inner wall of a container, is arranged either on the splaying mandrel or in the support ring. Then they move together relatively until the deformation position is reached. The production of the stacking projection occurs by the interaction of a retaining indentation running at least in places around the outside of the splaying mandrel and a notch projection running at least in places inside the support ring. In the deformation position the notch projection presses the corresponding container wall into the retaining indentation, whereby the appropriate stacking projection is formed in this way.

In order here to be able to take into account variations in wall thickness, in the deformation position a gap width between the retaining indentation and notch projection is greater at least in one border section than the gap width between the other circumferential sections of the splaying mandrel and support ring. The appropriate border section here corresponds to the above mentioned overlapping border section of the container wall in which it exhibits a larger wall thickness. An exact assignment of the overlapping border section of the container wall and the border section occurs with increased gap width. Outside of this border section the gap width in the other circumferential sections of the splaying mandrel and support ring between in particular the notch projection and retaining indentation is less and matched to the wall thickness of the container wall in this region.

To also take into account the corresponding variation of the wall thickness outside of the region in which the stacking projection is formed, the gap width in the circumferential section above the retaining indentation and notch projection, i.e. in the border section, can be greater than in the remaining circumferential section. That is, the larger gap width is also present respectively above and optionally also below the retaining indentation and notch projection which interact in the deformation position in each case. Here however, the enlarged gap width can be restricted to the region in the circumferential direction corresponding to the appropriate border section, i.e. where the inner wall of the container exhibits its corresponding overlapping border section.

The retaining indentation can be simply formed in that it is formed stepwise between an upper wall section and a lower wall section of the splaying mandrel. Generally, this stepwise retaining indentation can extend over the complete circumference of the splaying mandrel. The assignment of the splaying mandrel and support ring, in particular in the deformation position, can be simplified if the upper and lower wall sections are sloped differently radially outwards relative to the vertical direction.

In this connection it can be especially of advantage if the slope of the lower wall section is greater than the slope of the upper wall section.

In order to design the shape of the splaying mandrel as simply as possible, the lower wall section can extend up to the lower face side of the splaying mandrel. There is also however the possibility that a further wall section with another progression can be arranged between the lower wall section and the lower face side of the splaying mandrel.

In order to improve the stack removal properties of corresponding containers, the lower wall section of the splaying mandrel can comprise an essentially vertically running connecting section, which in particular has a reduced conicity compared to the conicity of the upper wall section, adjacent to and below the retaining indentation. This results in an improved step formation of the corresponding stack projection.

In order to further improve the formation of the step the notch projection can be particularly formed as a notch step running completely round in the circumferential direction.

By interaction of the corresponding steps, a step-shaped stacking projection with essentially horizontal and vertical parts of the step is also produced. Such a stacking projection is favourable both for stack removal and for reliable stacking.

To simplify the release of the container wall after producing the stacking projection, the notch projection or the notch step can be formed between an essentially vertical wall section and a wall section of the support ring splayed conically outwards. The vertical wall section extends from the notch projection downwards and the wall section, which is splayed conically outwards, extends upwards from it.

The insertion of the container of an inner container wall into the support ring can furthermore be simplified if the corresponding conical wall section of the support ring runs outwards rounded at its upper free end.

In order to optionally vary the protruding stacking projection in the region of the border section according to requirements, the splaying mandrel can particularly in the border section comprise a first gap enlargement indentation, which extends in the vertical direction at least in the region of the retaining indentation, and/or the support ring can exhibit, at least in the region of the notch projection, a second gap enlargement indentation extending in the vertical direction. These gap enlargement indentations each extend radially inwards or radially outwards and the size of these indentations defines whether in the region of the border section of the stacking projection, for example, more protrudes inwards from the container wall than outside of the border section. This would, for example, be achieved in that only a first gap enlargement indentation is provided for the splaying mandrel.

There is also the possibility of providing only the second gap enlargement indentation in the support ring, so that in conjunction with the above described larger gap width in this region the stacking projection in the region of the border section does not protrude further inwards than in the other sections, because the additional material thickness of the container wall in this region is taken up by the second gap enlargement indentation. Since a corresponding container apart from this inner container wall also comprises an outer container wall, which is inserted with the formation of a gap between the two container walls on the inner container wall, such a material protruding outwards from the inner container wall in the region of the second gap enlargement indentation would be covered by the outer container wall and would not be visible.

Appropriate combinations of the first and second gap enlargement indentations are possible.

In order to be able to arrange the container of at least inner container wall reliably and also reproducibly in the support ring, the support ring can comprise an annular bottom for placing down the respective container. There is also the possibility that the container does not stand directly on the annular bottom, but is rather held in an appropriate position by contact of the outer side of its inner container wall with the notch projection or that the annular bottom has some projecting surface supporting a lower side of the bottom wall of the container.

The device according to the invention can be used for different container cross-sectional shapes, such as, rectangular, oval or also other cross-sections. Similarly, circular-shaped cross-sections are possible, which are particularly preferred for drinking containers.

To hold the inner container wall of the container in the support ring and/or to remove it from the support ring after producing the stacking projection, the support ring can comprise a pressure line opening out into the annular bottom. Via this pressure line, negative pressure, for example, can be applied to fix the inner container wall in the support ring through this negative pressure. Generally, the inner container wall already comprises a bottom so that between the bottom and the edge flange of the inner container wall protruding over the bottom an enclosed space is formed in which the appropriate negative pressure can be produced.

Similarly, after producing the stacking projection it is also possible to support the removal of the container by applying an appropriate positive pressure.

The various gap widths described in the introduction can have different relationships to one another. With a simple embodiment the gap width in the border section can, for example, be essentially as large as in the other circumferential sections outside of the border section. In this way particular consideration is given in that in the overlapping border section of the container wall essentially double the material thickness is present compared to outside of this section, because here the ends of the blank of the container wall, meeting together, are joined by overlapping. Consequently, here there is double the material thickness compared to outside of the overlapping border section. However, there is also the possibility that the gap width in the border section is greater than, for example, outside of this section, but less than double the gap width outside of the border section.

In order to be able to arrange the corresponding overlapping border section of the inner container wall of the container without exerting a great amount of pressure also in the deformation position between the splaying mandrel and the support ring, the first and/or second gap enlargement indentations can extend over the complete height respectively depth of the splaying mandrel respectively of the support ring.

It can be regarded as sufficient if a width of the gap enlargement indentation in the circumferential direction essentially corresponds to a width of the appropriate overlapping border section of the container wall.

In order to be able to sufficiently accommodate and support the container wall during the deformation of the stacking projection and to provide same in the appropriate height, the height of the notch projection for forming the stacking projection is at least slightly bigger than the distance between said bottom and a potential contact starting point at which a container when inserted within another container starts to contact the inner side of the wall of the outer container.

The invention also relates to a container, the inner wall or container wall of which has been processed with the above described device for producing the appropriate stacking projection. Such a container comprises conical inner and outer walls, becoming narrower at the bottom, which are joined together at least on the upper edge of the container. The outer wall comprises on its lower end a supporting edge in particular protruding towards the inner wall. This contacts the inner wall externally, possibly forming an air gap between the walls. The corresponding stacking projection is formed as a shoulder or the like pointing inwards on an inner side of the inner wall. This shoulder is produced by the device mentioned in the introduction. The supporting edge of the respective outer container is supported on this stacking projection when containers are inserted in one another.

Easy stacking and removal with a clearly defined stack removal depth arises when the shoulder or stacking projection is formed by an essentially vertical first wall section and a second wall section, which is aligned radially outwards and connected at its upper end. The respective wall sections of the inner wall of the container running above and below the stacking projection run particularly collinearly, i.e. they do not just run parallel to one another, but rather along a straight line and are only separated from one another by the stacking projection.

Here, the stacking projection extends in particular also in the corresponding overlapping border section, because the device according to the invention produces the stacking projection also in the appropriate border section of the device. Furthermore, the corresponding shoulder or stacking projection can extend not just section by section running in the circumferential direction, but rather also completely in the circumferential direction.

In principle there is the possibility that the shoulder does not run at a fixed level of height, but rather for example at a level of height sloped to the longitudinal direction of the container. Here, the stacked container would only rest on the shoulder arranged the highest in the inside of the accommodating container. Similarly, it is possible that the shoulder runs at a level of height perpendicular to the vertical or the longitudinal direction of the container and in particular completely around it, whereby this level of height is arranged spaced to the container bottom.

It has already been pointed out in connection with the appropriate device that, depending on its formation, there is the possibility that the stacking projection particularly protrudes further inside the border section than in the other sections. In this way there arises, for example, a shoulder on the inner container wall which comprises a second wall section in the region of the corresponding overlapping border section which protrudes radially further inwards than the second wall section outside of this section. It is however also possible that the second wall section protrudes equally far over the complete extent of the shoulder or also the second wall section in the overlapping border section protrudes less than the second wall section outside of this section.

Analogously, there is the possibility that the outer diameter of the inner wall within and outside of the overlapping border section is the same. Since the inner wall is covered by the outer wall in the finished container, there is however also the possibility that the outer diameter within the overlapping border section is greater than outside of this section.

In order to be able to insert the containers far enough one into the other during stacking and at the same time to facilitate removal from the stack, the supporting edge of the outer wall between the lower end of the first wall section and the container bottom can contact the inner wall.

In this connection it can also be of advantage if the distance between the second essentially horizontal wall section and the floor area of the container bottom is greater than or equal to the distance between the lower end of the supporting edge and the free lower end of the container, wherein the last distance may also be zero.

In order essentially to provide a filling level indicator and/or at the same time to facilitate fastening the outer wall to the inner wall, the inner wall can comprise a shoulder which protrudes outwards in the direction of the outer wall adjacent to the upper edge of the container and on which the outer wall is positioned from outside, in particular, with the formation of a joint of the outer and inner walls.

It is possible that the outer wall extends to the lower free end of the container such that in principle inner and outer wall have the same length and at least end at the same position at their lower ends. In such a case the lower free ends of inner and outer walls are such supporting edges which will contact the corresponding stacking projection if containers are inserted in each other.

In both cases, which means with inner and outer walls having the same or different lengths in longitudinal direction of the container, it is also possible that the outer wall has a surface with wave-like protrusions and made of a cardboard material. Those wave-like protrusions extend essentially from the upper end of the outer wall to its lower end and may be linear or also be inclined with respect to the longitudinal direction of the container. It is also possible that those wave-like protrusions of the corresponding material extend from the top to the bottom of the corresponding wall but are curved in this direction.

The corresponding shoulder or stacking projection may have different forms, wherein the shoulder may also have a rounded edge, may be rib-like, may be formed by dimples or other protrusions extending to the interior of the container. The corresponding stacking projection may be formed by a number of subunits that are arranged along an inner circumference of the inner wall. It is possible that those subunits are uniformly separated from each other or that they are arranged in groups and it is also possible that they have an non-uniform distance from one subunit of such stacking projection to the other one.

In particular in case of cardboard material for the outer wall, it is possible to directly fix inner and outer walls to each other without an air gap therebetween. A corresponding heat insulation is then formed by the wavy structure of the cardboard material.

According to the invention the container may also be formed with a more general denesting means.

Concerning this general denesting means there is a particular relation between its distance to the bottom of the corresponding container and a so-called potential contact starting point. According to the invention, such distance between the stacking projection as such a denesting means and the bottom of the container is at least slightly larger than the distance between said bottom and a potential contact starting point at which the outer container when inserted into the container starts to contact the inner side of the inner wall of the outer container.

Corresponding potential contact starting point and its height relative to the container bottom depends on different parameters as, for example, conicity of the inner wall, the outer wall or sleeve, the thickness of the outer wall or sleeve, where the lower end of the sleeve is arranged with respect to the inner wall or free end of the container, etc.

Then when the container is inserted in the interior of an outer container, this corresponding potential contact starting point will, for example, be arranged higher with respect to the bottom of the outer container in case the sleeve or outer wall of the inner container has a reduced conicity compared to its inner wall. This means that in particular the distance between inner wall and outer wall of such a container increases in direction to the bottom of the container. Otherwise, in case both walls are parallel to each other, the potential contact starting point will be arranged closer to the bottom. Also the thickness of the outer wall has an influence on the corresponding potential contact starting point wherein this will be arranged higher with respect to the bottom of the corresponding outer container in case the wall thickness of the outer sleeve is higher.

Furthermore, in case the lower end of the outer sleeve or outer wall is arranged directly adjacent to the lower end of the inner wall such that, for example, the free lower end of the container is formed by both lower ends of both walls, then generally the potential contact starting point will be arranged closer to the bottom of the outer container as when the lower end of the outer wall is arranged upwards from the lower end of the inner wall of such a container. The free end of the container is only formed by the inner wall.

In the following an advantageous embodiment of the invention is explained in more detail based on the figures given in the drawing.

Figure 2:
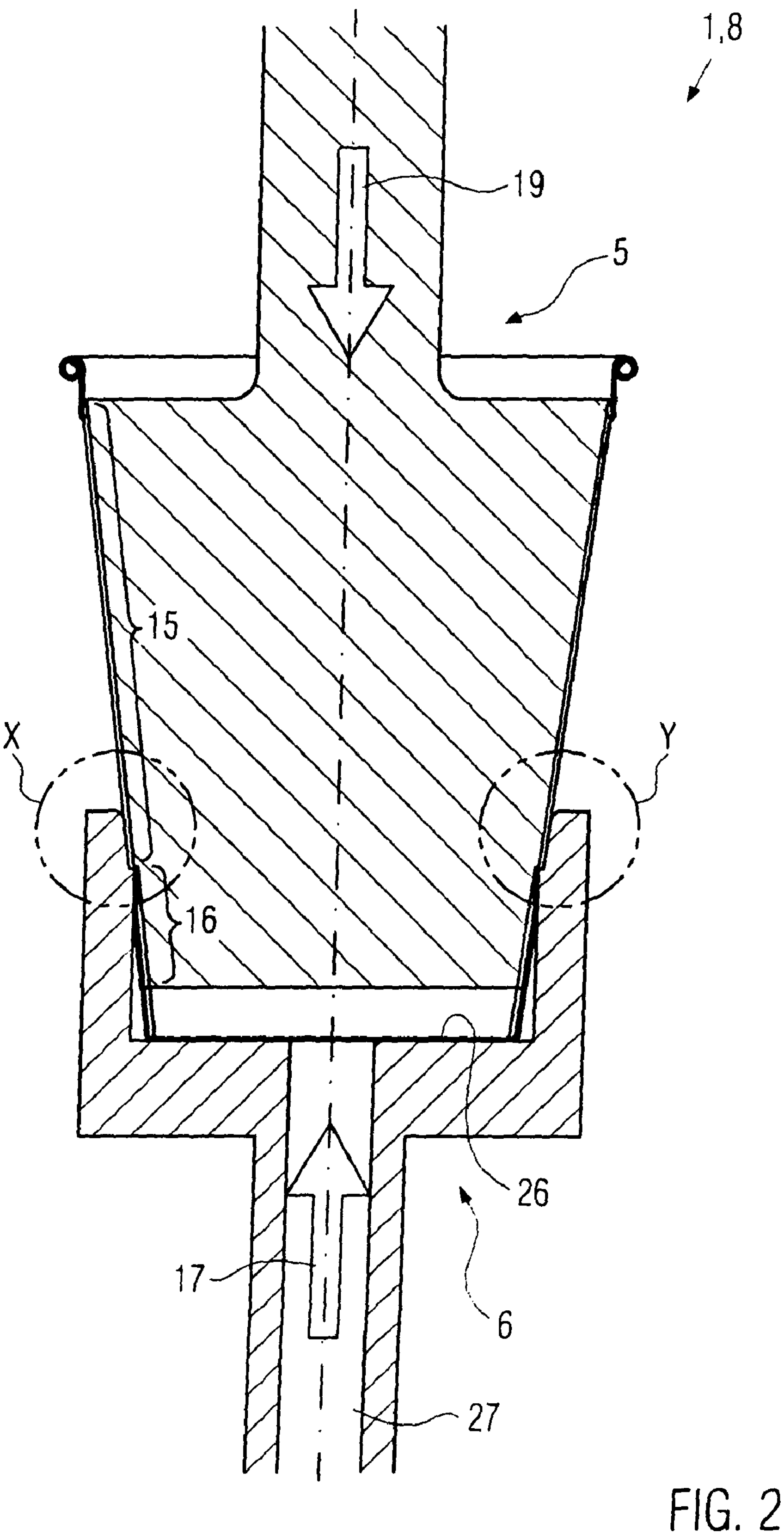
Figure 3:
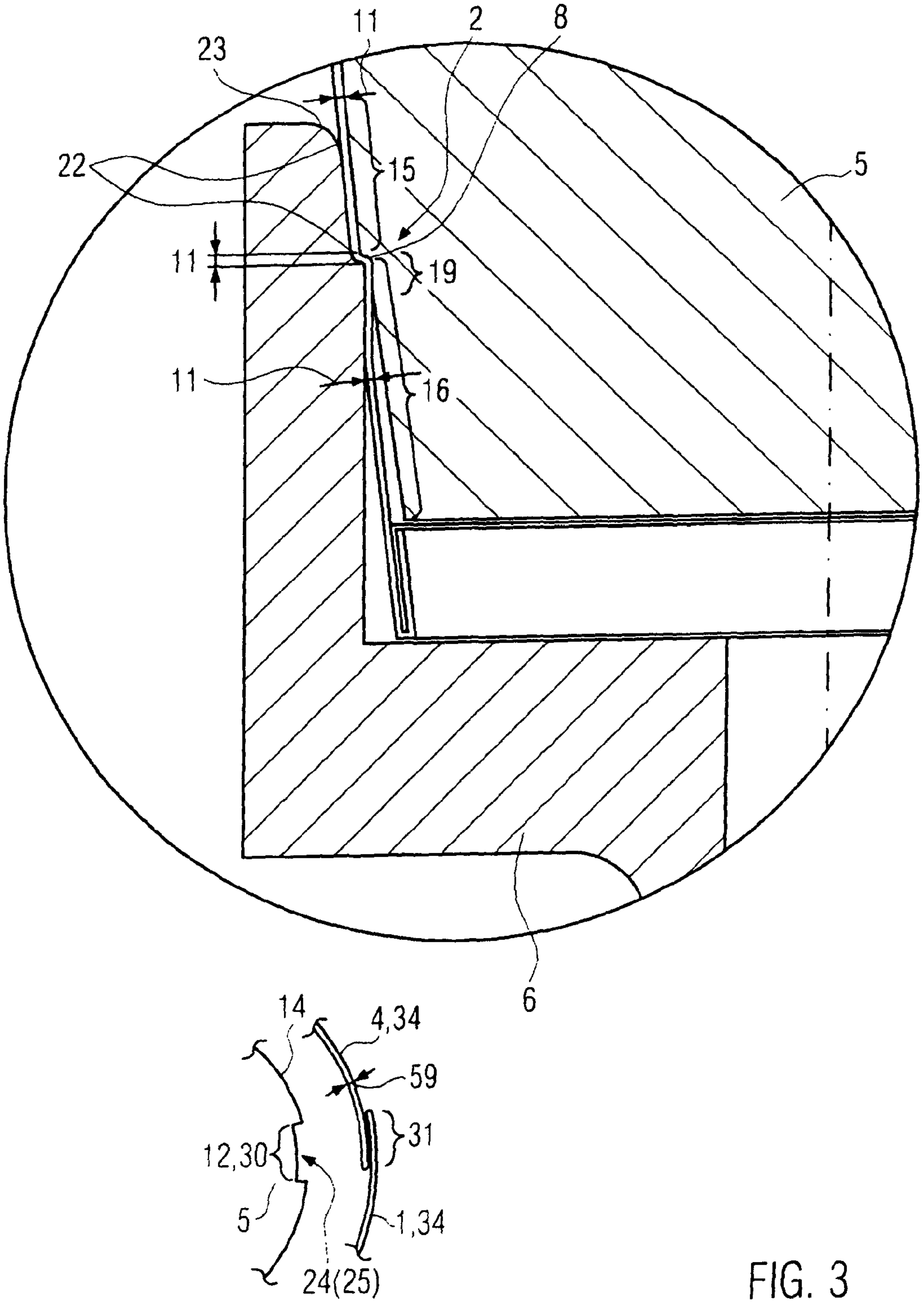
Figure 4:
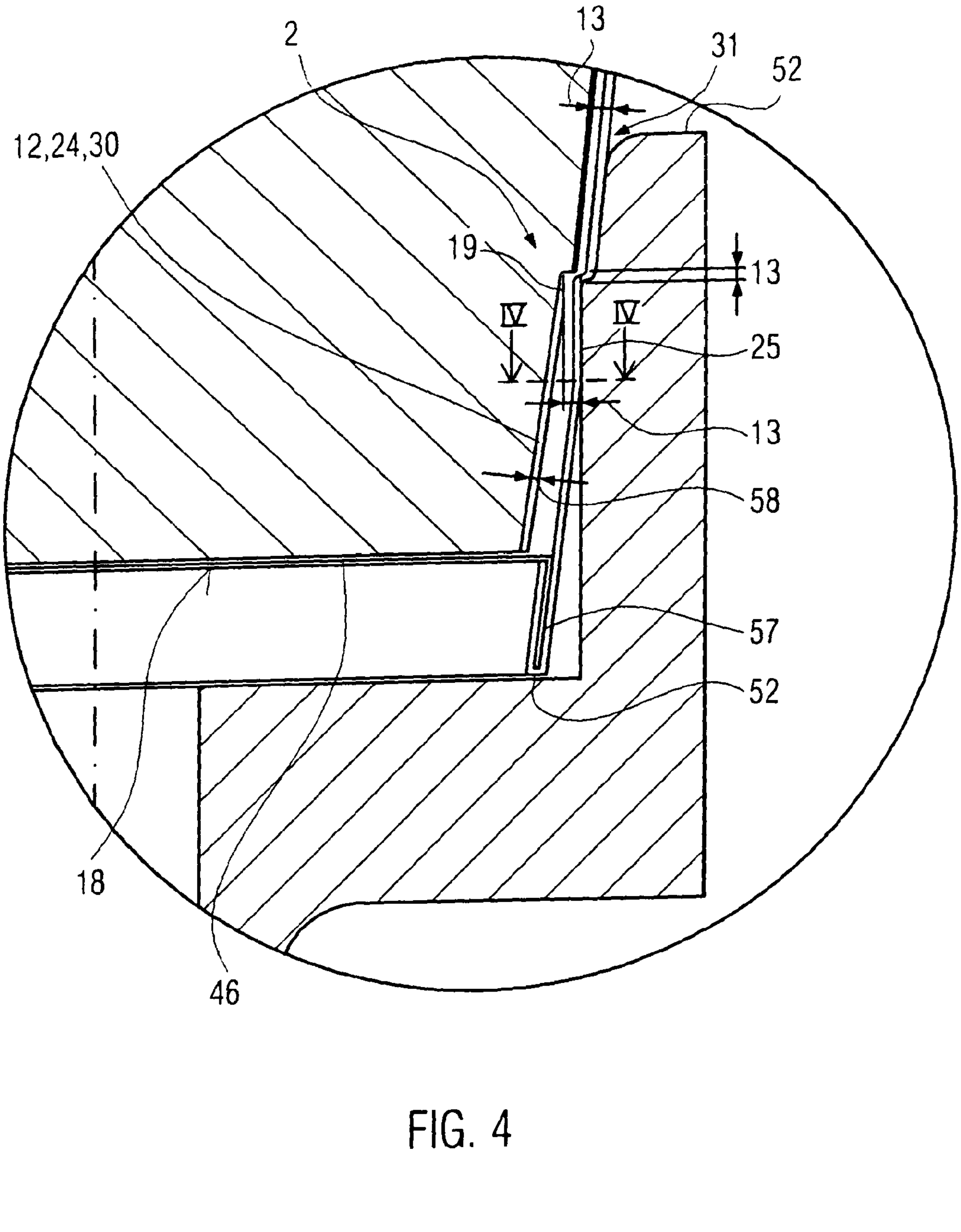
Figure 5:
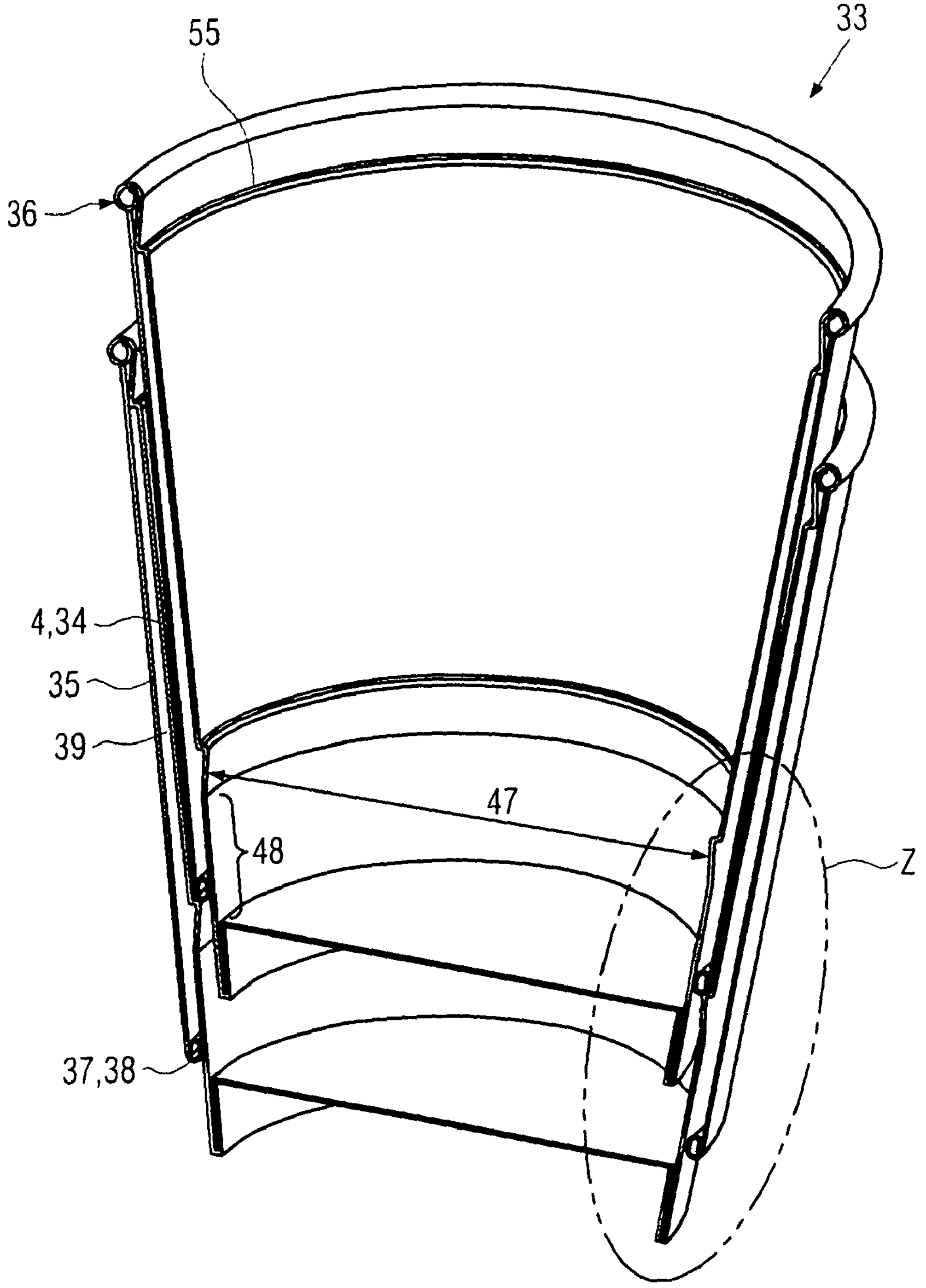
Figure 6:
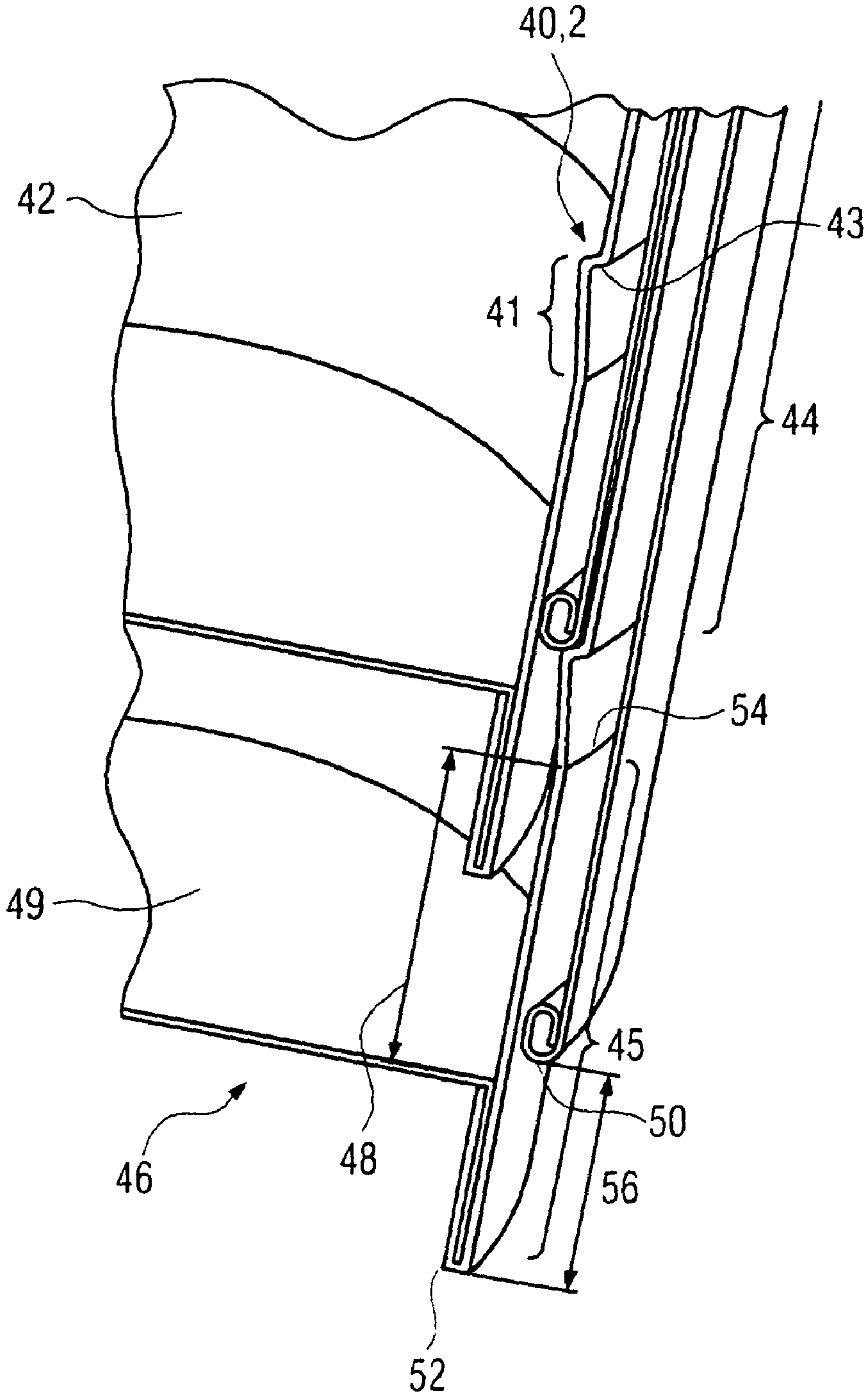

The following are shown:

FIG. 1 an embodiment of the device according to the invention for producing a stacking projection in the standby position;

FIG. 2 the device according to FIG. 1 in the deformation position;

FIG. 3 an enlarged illustration of detail "X" from FIG. 2;

FIG. 4 an enlarged illustration of detail "Y" from FIG. 2;

FIG. 5 containers according to the invention, sectioned in the longitudinal direction stacked one in the other;

FIG. 6 an enlarged illustration of the detail "Z" from FIG. 5, and

Figure 7:
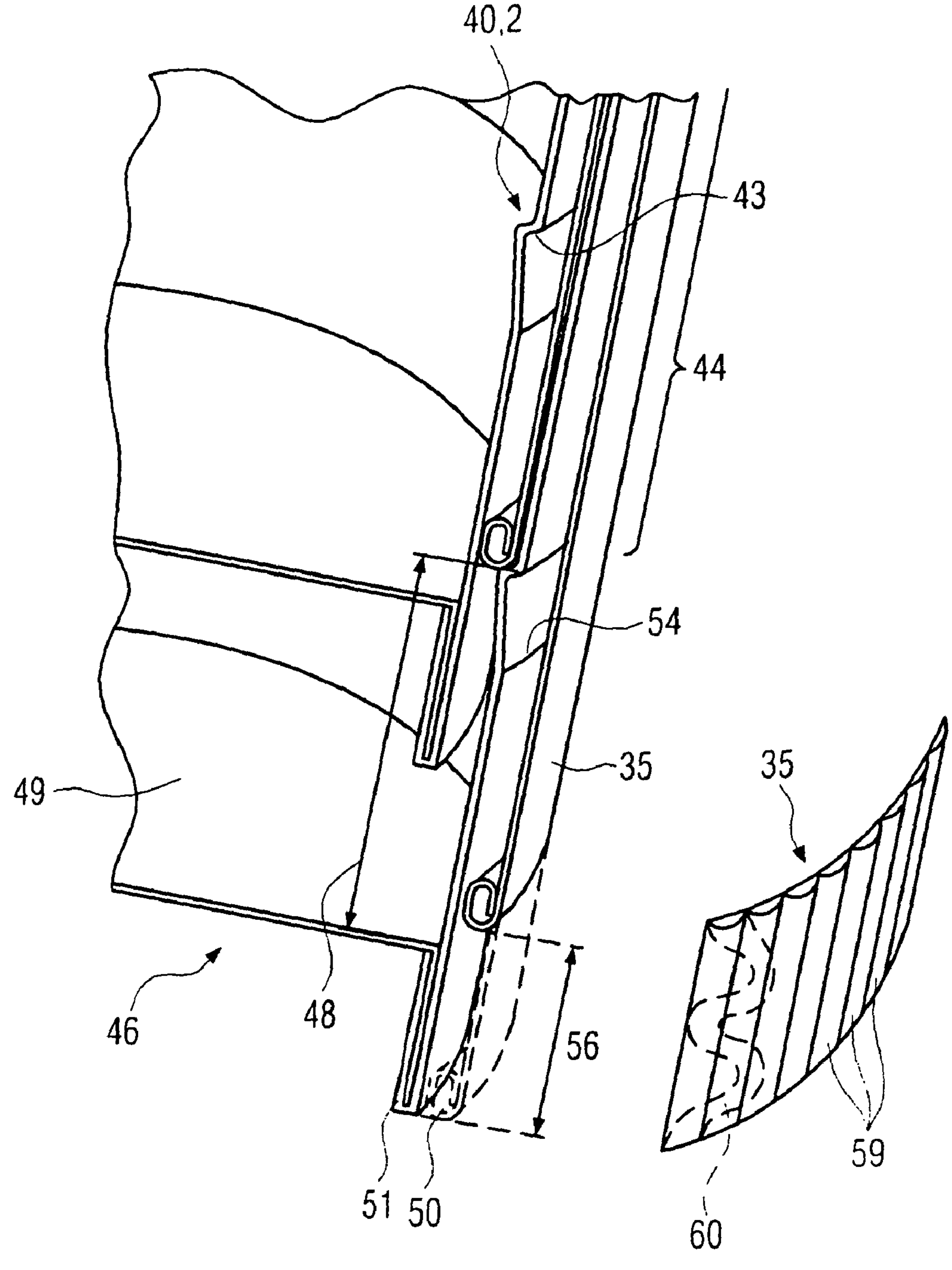

FIG. 7 an enlarged illustration of detail "Z" from FIG. 5 for a further embodiment.

FIG. 1 shows a side sectional view of a device 1 according to the invention for producing a stacking projection 2, refer for example to FIG. 4, on an inner side 3 of a container wall 4. The container wall 4 is an inner wall 34, refer also to FIGS. 5 and 6, of a container 33.

The device 1 comprises a splaying mandrel 5 and a support ring 6 open at the top. In FIG. 1 they are arranged in the standby position 7 spaced apart from one another. The splaying mandrel 5 and support ring 6 can be moved relative to one another in order for example to assume the deformation position 8 according to FIG. 2.

The splaying mandrel 5 narrows conically in the direction of the support ring 6 and comprises an upper conical wall section 15 and a lower conical wall section 16. A retaining indentation 9 is arranged between them.

Between the splaying mandrel 5 and the support ring 6 the container 33 is arranged which is formed after production from the inner wall 34 as a container wall 4 and an additional outer wall 35, see FIGS. 5 and 6. The container wall 4 exhibits a stacking projection 2 on its inner side or in the inside of the container 53, see for example FIG. 4.

The support ring 6 comprises an annular bottom 26 on which the container 33 can be placed. The support ring 6 is formed essentially pot-shaped, whereby a pressure line 27 for applying negative and/or positive pressure opens into the corresponding annular bottom 26. The wall of the support ring 6 comprises a lower vertical wall section 21 and a conical wall section 22 joined to it at the top. A notch projection 10 is formed between them.

In FIG. 2 the splaying mandrel 5 and the support ring 6 are arranged in the deformation position 8, whereby normally the splaying mandrel 5 is moved in the vertical direction 17 relative to the support ring 6. The beaker 33 is inserted into the support ring 6, which is open at the top, so far that its lower base edge 57, refer also to FIG. 4, stands on the annular bottom 26.

For holding the container 33 before insertion of the splaying mandrel 5, a negative pressure can be applied via the pressure line 57 to the free space formed between the container bottom and the base edge.

In FIGS. 3 and 4 the details "X" and "Y" according to FIG. 2 are illustrated enlarged. In the lower part of FIG. 3 a schematic representation of a section along the line IV-IV from FIG. 4 is also illustrated. This sketch is used for explanation of the border section 12 and the overlapping border section 31. The border section 12 is a section of the circumference of the splaying mandrel 5 which is illustrated in a longitudinal section in FIG. 4. In the border section 12 a first gap enlargement indentation 24 is formed. This is used for accommodating an overlapping border section 31 which is part of the container wall 4. In this overlapping border section 31 the corresponding container wall 4 is arranged with the free ends overlapping so that the corresponding wall thickness 59 of the container wall 4 in the overlapping border section 31 is essentially double so large as in the remaining sections of the container wall 4 or inner wall 34 of the container 33.

It should be pointed out that a corresponding border section 12 can also be formed in the support ring 6 by means of a second gap enlargement indentation 25, whereby the two gap enlargement indentations 24, 25 can be used alternatively or also in combination.

In the upper part of FIG. 3 the interaction of the splaying mandrel 5 and the support ring 6 is essentially illustrated opposite to this border section 12. In the deformation position 8, refer also to FIG. 2, the retaining indentation 9 and the notch projection 10 are arranged together such that the appropriate stacking projection 2 is formed in the container wall 4 between them. The gap width, i.e. essentially the spacing of the splaying mandrel 5 and support ring 6 in the region of the retaining indentation 9 and notch projection 10 is indicated by the reference symbol 11, whereby this gap width corresponds essentially to the material thickness of the container wall 4.

The corresponding gap width 11 is present not only in the region between the retaining indentation 9 and the notch projection 10, but rather also in the region between the conical wall section 22 of the support ring 6 and the upper conical wall section 15 of the splaying mandrel 5. In FIG. 3 it can in particular be seen that the conical wall section 22 runs outwards rounded off at its upper end 23.

The lower wall section 16 of the splaying mandrel 5 comprises an essentially vertical step joining section 19 below and adjacent to the retaining indentation 9.

The upper and lower wall sections 15, 16 of the splaying mandrel 5 in the illustrated embodiment run radially outwards sloped relative to the vertical direction 17, refer also to FIGS. 1 and 2. Here, the slope of the lower wall section 16 is greater than the corresponding slope of the upper wall section 15.

Analogously in FIG. 4 the interaction of the retaining indentation 9 and the notch projection 10 is illustrated in the region of the border section 12. In this border section 12 a gap width 13 is greater than the corresponding gap width 11 according to FIG. 3. In particular the gap width 13 is essentially double as large as the gap width 11.

The corresponding overlapping border section 31 of the container wall 4 or of the inner wall 34 is arranged in this border section 12, refer also to FIG. 3 in the lower part. The enlarged gap width is achieved at a corresponding embodiment of the invention particularly in that a first or second gap enlargement indentation 24 or 25 is formed on the outer side of the splaying mandrel 5 and/or on the inner side of the support ring 6. The second gap enlargement indentation 25 is indicated with a broken line in FIG. 4, whereby in the illustrated embodiment a first gap enlargement indentation 24 is formed.

Compared to the further circumferential section of the splaying mandrel 5, this is set back radially inwards by a depth 58. The corresponding border section 12 extends in particular in the region of the retaining indentation 9 and notch projection 10 in the corresponding deformation position 8. However, the border section 12 can also extend upwards and downwards further in the upper or lower wall section 15 or 16 of the splaying mandrel 5 and/or correspondingly in the vertical or conical wall section 21 or 22 of the support ring 6.

In FIGS. 3 and 4 it can be seen that both the retaining indentation 9 and the notch projection 10 are essentially formed step-shaped. In this way the notch projection 10 is formed as the notch step 20 which extends radially inwards from the upper wall section 15 and passes over the essentially vertical step joining section 19 in the lower wall sections 16. Analogously, the retaining indentation 9 is formed step-shaped between the vertical wall section 21 and the conical wall section 22 of the support ring 6.

In the illustrated embodiment of the device 1 according to the invention the splaying mandrel 5 and the support ring 6 each exhibit a circular cross-section. However, there is also the possibility of them exhibiting an oval or also a rectangular cross-sectional shape. With containers used as drinking vessels normally a circular cross-sectional shape is preferred.

It should again be pointed out that the corresponding gap enlargement indentations can each extend over the complete height 28, refer to FIG. 1, of the splaying mandrel 5 or over the complete depth 29 of the support ring 6.

The appropriate width 30, refer to the lower part of FIG. 3, of the border section 12 or of the associated gap enlargement indentation 24 or 25 corresponds in the circumferential direction essentially to the width of the overlapping border section 31 of the container wall, so that the overlapping border section 31 can be fully arranged in the border section 12 or in the corresponding gap enlargement indentation.

With the device 1 according to the invention it has been found sufficient if the depth 21 of the support ring 6 corresponds to 20% to 40% and preferably 25% to 35% of the height 32 of the container 33. The corresponding height 28 of the splaying mandrel 5 is generally less than the height 32 of the container so that the splaying mandrel 5, refer also to FIG. 2, is arranged completely in the interior of the container in the deformation position 8.

In FIG. 5 or 6 a longitudinal section through stacked containers 33 and an enlarged illustration of a detail "Z" from FIG. 5 are illustrated. In these figures, as in all other figures, the same reference symbols identify in each case the same parts and are sometimes mentioned only in connection with a figure.

From the container 33 according to FIGS. 5 and 6 the inner wall 34 is in each case formed as an appropriate container wall 4 with a stacking projection 2 or an appropriate shoulder 40 on its inner side 3, 53 by means of the device according to the invention shown in FIGS. 1 to 4. The inner wall 34 comprises on its lower end the container bottom 46 with floor area 49. The container bottom is fixed to the inner wall 34 by folding over its lower ends in a known manner. The inner wall 34 is beaded outwards at its upper end for the formation of an upper container edge 36. A shoulder 55 is arranged below this upper container edge 36. This shoulder is formed by the outward deformation of the inner wall 34, whereby the outer wall 35 contacts the outer side of the inner wall in the region of this shoulder 55 and is in particular attached there. The outer wall 35 can also be fixed at its upper free end to the upper container edge 36. The outer wall 35 exhibits a supporting edge 38 at its lower end 37, pointing in the direction of the inner wall 34. This supporting edge can also be formed by the beading of an appropriate edge section of the outer wall 35. The supporting edge 38 contacts the inner wall 34 from outside, whereby an air gap 39 is formed between it and essentially up to the shoulder 55. This provides thermal insulation for the container 33.

At a distance 48 to the floor area 49 an essentially vertically running first wall section 41 terminates, refer in particular to FIG. 6. This is part of the stacking projection 2 or shoulder 40 and is supplemented by a second essentially horizontal wall section 43. On the stacking projection 2 or shoulder 40 an upper wall section 44 is connected in the direction of the upper container edge 36 and in the direction of the container bottom 46 a lower wall section 45 is connected. These wall sections 43, 44 generally run parallel to one another and are in particularly collinear, i.e. they extend along a straight line.

With the illustrated embodiment the stacking projection 2 extends along the whole circumference of the inner wall 34 and at a horizontal level of height spaced to the container bottom, refer to distance 48 in FIG. 5. It should also be noted that depending on the embodiment of the container 33 according to the invention, the corresponding second horizontal wall section 43 of the shoulder 40 or of the stacking projection 2 extends in the overlapping border section 31 further radially inwards than the corresponding second wall section in the other circumferential sections outside of the overlapping border section.

With another embodiment the second wall section 43 extends along the complete circumference in each case equally far inwards, i.e. also in the overlapping border section 31.

Depending on the extent of the corresponding wall section 43 an outer diameter 47 of the inner wall 34 varies in this region, i.e. in the region of the overlapping border section 31. With one embodiment the outer diameter of the inner wall within and outside of the overlapping border section 31 is the same. It is also possible that the outer diameter within the overlapping border section is greater than outside of this section. If the corresponding outer diameter is larger, the inner wall 34 exhibits a projection protruding outwards in the region of the overlapping border section 31, which forms at least in the region of the stacking projection 2 and is covered by the outer wall 35. The supporting edge 38 of the outer wall 35 is arranged relative to the inner wall 34 so that it is arranged between the lower end 54 of the first wall section 41 and the floor area 49 of the container bottom 46 and makes contact there externally with the inner wall 34.

A corresponding distance between the second horizontal wall section 43 of the stacking projection 2 and the floor 49 of the container bottom 46 is larger than or equal to the distance 56 between the lower end 50 of the supporting edge 38 and a free lower end 52 of the container 33, refer to FIG. 6.

Through the device according to the invention it is possible in a favourable manner to form a stacking projection without difficulties in an appropriate overlapping border section 31 of the inner wall 34 of a container 33, refer in this respect to FIG. 4. In this way there is in particular the possibility of producing a complete circumferential stacking projection 2. The stacking projection 2 here exhibits a special shape according to the embodiment, illustrated in FIGS. 5 and 6, from the first vertical wall section 41 and the second horizontal wall section 43. In this way stacking the containers is easy and can be done in a reproducible way without different stacking depths arising and at the same time the containers can be removed from the stack without difficulty.

FIG. 7 shows a cup similar to FIG. 6 for a further embodiment of the invention. This is different from the embodiment of FIG. 6 in that the outer wall 35 has an increased length wherein the outer wall may in particular extend up to the free end 51 of the container 33, see the broken line in FIG. 7. In such a case the supporting edge 38 will be arranged with its lower end 50 adjacent to the free end 51 of the container or the container bottom, respectively, such that a stacking height will be slightly increased by replacing the corresponding lower end 50 on stacking projection 2 if such containers are stacked. However, such an increased stacking height may at least partially be compensated with arranging the corresponding stacking projection 2 near or directly adjacent to container bottom 49.

A further embodiment of the invention comprises an outer wall 35 with an inner and/or outer surface that is not smooth, wherein it is also possible for such an embodiment to avoid a corresponding supporting edge 38. An example for such outer wall 35 is a wave-like structure on its inner and/or outer surface, see for example outer wall 35 in the lower part of FIG. 7 with waves 59 that extend in the lengthwise direction of the wall from the top to the bottom. For such waves it is possible that they extend linear from the top to the bottom. But it is also possible, see reference numeral 60, that they are curved in lengthwise direction. According to a further embodiment corresponding waves 59, 60 do not extend for example in the vertical direction of the container, but inclined with respect to this direction.

The outer wall 35 with such wave-like protrusions may end corresponding to the outer wall with corresponding supporting edge 38, see for example FIG. 5 or 6, but the corresponding outer wall may also extend to free end 51 of container 33, see FIG. 7.

In case such an outer wall of, in particular, cardboard material, is used to provide such wave-like protrusions and if those protrusions extend to the exterior of the outer wall then no air gap or gaps will be formed between inner and outer wall and instead a smooth inner surface of the outer wall will abut against the outer surface of the inner wall without any air gaps therebetween. However, a plurality of air chambers are formed by the corresponding wave-like protrusion which are in general hollow in their interior.

Consequently, also with an outer wall with wave-like protrusions it is possible for a user of the container to avoid any direct contact with some hot ingredient filled in the container.

Concerning the stacking projections 2 it has to be considered that they may be formed by sections of such projections or also a plurality of such projections that have not to extend over the whole length of corresponding inner circumference of the inner wall. Instead, a corresponding stacking projection may be formed by subunits that only extend along a particular section of such inner circumference wherein those sections may be separated by a uniform distance. It is also possible that instead of such sections a plurality of dimples or the like are arranged which also may have uniform or also a non-uniform distance therebetween.

Other possibilities for forming such stacking projections 2 are rib-like projections, shoulders as outlined above or other projections extending to the interior of the container.

The invention claimed is:

1. A device for producing a stacking projection on an inner side of a container wall with a splaying mandrel and a support ring open at the top, which are movable relative to one another between a standby position and a deformation position, wherein the splaying mandrel comprises at least in some places a retaining indentation running externally circumferentially and the support ring comprises at least in some places a notch projection running internally circumferentially, through the interaction of which in the deformation position the stacking projection can be produced, wherein in the deformation position a gap width between the retaining indentation and the notch projection in a border section of the circumference is greater than a gap width between the other circumferential sections and wherein the border section of the circumference is configured to accommodate opposite, overlapped ends of the container wall.

2. The device according to claim 1, wherein the gap width in the border section above and/or below the retaining indentation and notch projection is larger than in the other circumferential sections.

3. The device according to claim 2, wherein the retaining indentation is formed step-shaped between an upper wall section and a lower wall section of the splaying mandrel.

4. The device according to claim 3, wherein the upper and lower wall sections are sloped outwards differently relative to a vertical direction.

5. The device according to claim 4, wherein the slope of the lower wall section is larger than a slope of the upper wall section.

6. The device according to claim 5, wherein the lower wall section extends to a lower face side of the splaying mandrel.

7. The device according to claim 6, wherein the lower wall section exhibits a step joint section with less conicity than the upper wall section adjacent to the retaining indentation.

8. The device according to claim 7, wherein the notch projection is formed as a notch step running in the circumferential direction.

9. The device according to claim 8, wherein the notch projection is formed between an essentially vertical wall section and a conical wall section of the support ring splayed outwards.

10. The device according to claim 9, wherein the conical wall section at the upper free end of the support ring runs outwards and is rounded off.

11. The device according to claim 10, wherein in the border section the splaying mandrel has a first gap enlargement indentation extending at least in the region of the retaining indentation in the vertical direction and/or the support ring has a second gap enlargement indentation extending at least in the region of the notch projection in the vertical direction.

12. The device according to claim 11, wherein the support ring comprises a bottom on which a container bottom can be placed.

13. The device according to claim 12, wherein the support ring and splaying mandrel exhibit a circular cross-sectional shape.

14. The device according to claim 13, wherein the support ring comprises a pressure line opening into the annular bottom.

15. The device according to claim 14, wherein the gap width in the border section is essentially twice as large as the gap width in the other circumferential sections.

16. The device according to claim 15, wherein the first and/or second gap enlargement indentation extend over a complete height of the splaying mandrel or a complete depth of the support ring, respectively.

17. The device according to claim 16, wherein a width of the gap enlargement indentation extends over a complete height of the splaying mandrel and complete depth of the support ring.

18. The device according to claim 17, wherein a height of the notch projection is bigger than a distance between bottom and a potential contact starting point at which the container when inserted within another container starts to contact the inner side of its wall.

19. The device according to claim 1 wherein the gap width in the border section of the circumference is greater than a width of an overlapping border section of the container wall.

* * * * *